(12) United States Patent
Berg et al.

(10) Patent No.: US 8,443,341 B2
(45) Date of Patent: May 14, 2013

(54) SYSTEM FOR AND METHOD OF CAPTURING APPLICATION CHARACTERISTICS DATA FROM A COMPUTER SYSTEM AND MODELING TARGET SYSTEM

(75) Inventors: Erik Berg, Lidingo (SE); Erik Hagersten, Uppsala (SE); Mats Nilsson, Taby (SE); Mikael Petterson, Koping (SE); Magnus Vesterlund, Stockholm (SE); Hakan Zeffer, Santa Clara, CA (US)

(73) Assignee: Rogue Wave Software, Inc., Boulder, CO (US)

( * ) Notice: Subject to any disclaimer, the term of this patent is extended or adjusted under 35 U.S.C. 154(b) by 1346 days.

(21) Appl. No.: 11/938,247

(22) Filed: Nov. 9, 2007

(65) Prior Publication Data

US 2009/0125465 A1    May 14, 2009

Related U.S. Application Data

(60) Provisional application No. 60/865,152, filed on Nov. 9, 2006.

(51) Int. Cl.
  *G06F 9/44* (2006.01)
(52) U.S. Cl.
  USPC .......................................................... 717/131
(58) Field of Classification Search .................. 717/124, 717/126–128, 130–131, 154; 711/167, 216; 703/21
  See application file for complete search history.

(56) References Cited

U.S. PATENT DOCUMENTS

| 5,237,673 | A | * | 8/1993 | Orbits et al. | 711/170 |
| 5,452,440 | A | | 9/1995 | Salsburg | |
| 5,564,015 | A | | 10/1996 | Bunnell | |
| 5,602,729 | A | | 2/1997 | Krueger et al. | |
| 5,729,710 | A | * | 3/1998 | Magee et al. | 711/203 |
| 5,796,939 | A | * | 8/1998 | Berc et al. | 714/47.3 |
| 5,870,606 | A | | 2/1999 | Lindsey | |

(Continued)

FOREIGN PATENT DOCUMENTS

| EP | 0 919 923 A2 | 6/1999 |
| EP | 0919923 | 6/1999 |

(Continued)

OTHER PUBLICATIONS

Chong et al., "Performance Analysis of Four Memory Consistency Models for Multithreaded Multiprocessors", IEEE Transactions on Parallel and Distributed Systems, Vol. 6, No. 10, Oct. 1995.*

(Continued)

*Primary Examiner* — Don Wong
*Assistant Examiner* — Daxin Wu

(57) ABSTRACT

A system for, method of and computer program product captures performance-characteristic data from the execution of a program and models system performance based on that data. Performance-characterization data based on easily captured reuse distance metrics is targeted, defined as the total number of memory references between two accesses to the same piece of data. Methods for efficiently capturing this kind of metrics are described. These data can be refined into easily interpreted performance metrics, such as performance data related to caches with LRU replacement and random replacement strategies in combination with fully associative as well as limited associativity cache organizations. Methods for assessing cache utilization as well as parallel execution are covered.

8 Claims, 25 Drawing Sheets

U.S. PATENT DOCUMENTS

| | | | |
|---|---|---|---|
| 5,920,725 A * | 7/1999 | Ma et al. | 717/171 |
| 5,940,855 A | 8/1999 | Kayes et al. | |
| 5,974,438 A * | 10/1999 | Neufeld | 718/104 |
| 6,145,122 A | 11/2000 | Miller et al. | |
| 6,347,366 B1 | 2/2002 | Cousins | |
| 6,434,741 B1 | 8/2002 | Mirani et al. | |
| 6,493,810 B1 | 12/2002 | Pang et al. | |
| 6,557,167 B1 | 4/2003 | Thelen | |
| 6,634,020 B1 | 10/2003 | Bates et al. | |
| 6,651,153 B1 | 11/2003 | Orfali | |
| 6,658,653 B1 | 12/2003 | Bates et al. | |
| 6,725,343 B2 * | 4/2004 | Barroso et al. | 711/145 |
| 6,742,084 B1 | 5/2004 | Dafouw et al. | |
| 6,892,173 B1 * | 5/2005 | Gaither et al. | 703/20 |
| 6,952,664 B1 | 10/2005 | Lahiri et al. | |
| 6,961,924 B2 | 11/2005 | Bates et al. | |
| 6,964,036 B2 | 11/2005 | Bates et al. | |
| 6,968,546 B2 | 11/2005 | Lueh | |
| 7,032,214 B1 | 4/2006 | Rodrigues et al. | |
| 7,047,519 B2 | 5/2006 | Bates et al. | |
| 7,093,081 B2 * | 8/2006 | DeWitt et al. | 711/144 |
| 7,263,599 B2 * | 8/2007 | Norden et al. | 712/205 |
| 7,318,124 B2 * | 1/2008 | Hama et al. | 711/118 |
| 7,363,450 B1 * | 4/2008 | Fedorova | 711/167 |
| 7,366,871 B2 * | 4/2008 | Cypher | 711/216 |
| 7,472,383 B2 | 12/2008 | Long et al. | |
| 7,571,188 B1 * | 8/2009 | Schwetman et al. | 1/1 |
| 7,644,397 B2 * | 1/2010 | Warren et al. | 717/131 |
| 7,669,189 B1 | 2/2010 | Umamageswaran | |
| 7,702,887 B1 * | 4/2010 | Grohoski et al. | 712/227 |
| 7,711,914 B2 | 5/2010 | Thelen et al. | |
| 7,711,988 B2 * | 5/2010 | Zhou et al. | 714/30 |
| 7,721,265 B1 | 5/2010 | Xu et al. | |
| 7,765,242 B2 * | 7/2010 | Hundt et al. | 707/803 |
| 7,783,865 B2 | 8/2010 | Burdick et al. | |
| 7,797,495 B1 * | 9/2010 | Lepak | 711/141 |
| 7,849,450 B1 | 12/2010 | Rydh et al. | |
| 8,032,868 B2 | 10/2011 | Bates et al. | |
| 8,051,409 B1 | 11/2011 | Umamageswaran | |
| 8,141,058 B2 | 3/2012 | Berg et al. | |
| 2002/0091763 A1 | 7/2002 | Shah et al. | |
| 2003/0126186 A1 * | 7/2003 | Rodgers et al. | 709/107 |
| 2003/0163479 A1 * | 8/2003 | Mathews et al. | 707/102 |
| 2004/0148152 A1 | 7/2004 | Horikawa | |
| 2004/0260517 A1 | 12/2004 | Ding et al. | |
| 2005/0049847 A1 | 3/2005 | Miyamoto et al. | |
| 2005/0086650 A1 | 4/2005 | Yates et al. | |
| 2005/0120341 A1 | 6/2005 | Blumenthal et al. | |
| 2005/0132336 A1 | 6/2005 | Gotwals et al. | |
| 2005/0149929 A1 * | 7/2005 | Srinivasan et al. | 718/100 |
| 2005/0160322 A1 * | 7/2005 | West et al. | 714/38 |
| 2005/0177633 A1 | 8/2005 | Plunkett | |
| 2005/0278145 A1 | 12/2005 | Yamamoto | |
| 2005/0283765 A1 | 12/2005 | Warren et al. | |
| 2006/0048101 A1 | 3/2006 | Krassovsky et al. | |
| 2006/0090040 A1 | 4/2006 | Eschmann | |
| 2006/0101421 A1 | 5/2006 | Bodden et al. | |
| 2006/0129999 A1 * | 6/2006 | Hiraoka et al. | 717/128 |
| 2006/0259704 A1 * | 11/2006 | Wyman | 711/141 |
| 2008/0244533 A1 | 10/2008 | Berg et al. | |
| 2009/0055594 A1 | 2/2009 | Berg et al. | |

FOREIGN PATENT DOCUMENTS

| | | |
|---|---|---|
| EP | 1 026 591 A2 | 8/2000 |
| EP | 1026591 | 8/2000 |
| WO | WO-2004/061620 A2 | 7/2004 |

OTHER PUBLICATIONS

Berg, E. et al. (Jun. 2005). "Fast Data-Locality Profiling of Native Execution." *ACM Sigmentrics Performance Evaluation Review*.33 (1):169-180.

Perelman, E. et al. "Using SimPoint for Accurate and Efficient Simulation." In Proceedings of the SIGMETRICS'03/ACM. San Diego, California, USA. Jun. 10-14, 2003; 2 pages.

Wunderlich, R. et al. "SMARTS: Accelerating Microarchitecture Simulation via Rigorous Statistical Sampling." In Proceedings of International Symposium of Computer Architecture. 2003.

Berg, E. et al. "StatCache: A Probabilistic Approach to Efficient and Accurate Data Locality Analysis." 2004 IEEE International Symposium on Performance Analysis of Systems and Software, Austin, TX., Mar. 10-12, 2004, p. 20-27.

Berg, E. et al. (Jun. 2005). "Fast Data-Locality Profiling of Native Execution." *ACM SIGMETRICS Performance Evaluation Review*.33 (1):169-180.

Noordergraaf, L. et al. "SMP System Interconnect Instrumentation for Performance Analysis." *Supercomputing, The Computer Society*. Proceedings of the IEEE/ACM SC2002 Conference. Nov. 16, 2002. p. 1-9.

Berg, E. et al. "A Statistical Multiprocessor Cache Model." 2006 IEEE International Symposium on Performance Analysis of Systems and Software, Austin, TX. Mar. 19, 2006. p. 89-99.

International Search Report and Written Opinion, mailed Dec. 22, 2008, directed to related International Patent Application No. PCT/US2007/013169; 22 pages.

Beyls, K. et al. "Reuse Distance as a Metric for Cache Behavior," Proceedings of PDCS'01. Parallel and Distributed Computing and Systems. Aug. 21, 2001.6 pages.

European Office Action mailed Oct. 13, 2010, directed to European Patent Application No. 07 795 719.9; 5 pages.

International Search Report and Written Opinion mailed Jul. 15, 2008, directed to counterpart International Application No. PCT/US07/84365; 9 pages.

Anderson, J., et al. (Nov. 4, 1997). "Continuous Profiling: Where Have All the Cycles Gone?" *ACM Transactions on Computer Systems*. 15(4):357-390.

Berg, E. et al. "SIP: Performance Tuning Through Source Code Interdependence" In Proceedings of the $8^{th}$ International Euro-Par Conference (Euro-Par 2002). Paderborn, Germany.177-186. Aug. 2002.

Beyls, K. et al. "Visualization Enables the Programmer to Reduce Cache Misses." In Proceedings of Conference on Parallel and Distributed Computing and Systems. 2002.

Browne, S. et al. "A Scalable Cross-Platform Infrastructure for Application Performance Tuning Using Hardware Counters." In Proceedings of International Conference on SuperComputing. *IEEE*. 2000.

Buck, B. et al. "Using Hardware Performance Monitors to Isolate Memory Bottlenecks." In Proceedings of International Conference on SuperComputing. *IEEE*. 2000.

Cascaval, C. et al. "Estimating Cache Misses and Locality Using Stack Distances." *ICS'03. ACM*. In Proceedings of International Conference on SuperComputing. San Francisco, California, USA. Jun. 23-26, 2003.

Chilimbi, T. et al. "Dynamic Hot Data Stream Prefetching for General-Purpose Programs." *PLDI'02.ACM*. Berlin, Germany. Jun. 17-19, 2002.

Chilimbi, T. "Efficient Representations and Abstractions for Quantifying and Exploiting Data Reference Locality." *ACM SIGPLAN '01*. Conference on Programming Language Design and Implementation (PLDI). Jun. 2001.191-202.

Conte, T. et al. (1998). "Combining Trace Sampling with Single Pass Methods for Efficient Cache Simulation." *IEEE Transactions on Computers*. 47(6):714-720.

DeRose, L. et al. "SIGMA: A Simulator Infrastructure to Guide Memory Analysis." In Proceedings of International Conference on SuperComputing. IEEE. 2002.

Eustace, A. et al. (1995). "ATOM: A Flexible Interface for Building High Performance Program Analysis Tools." USENIX Winter. 303-314.

Gecsei, J. et al. (1970). "Evaluation Techniques for Storage Hierarchies." *IBM Systems Journal*.9(2):78-117.

Ghosh, S. et al. (Jul. 4, 1999). "Cache Miss Equations: A Compiler Framework for Analyzing and Tuning Memory Behavior." *ACM Transactions on Programming Languages and Systems*. 21(4):703-746.

Itzkowitz, M. et al. "Memory Profiling Using Hardware Counters." *SC'03 ACM*. 1-13. in Proceedings of SuperComputing. Nov. 15-21, 2003, Phoenix, Arizona, USA.

Kessler, R. E. et al. (Sep. 1991). "A Comparison of Trace-Sampling Techniques for Multi-Megabyte Caches." *IEEE Transaction on Computers*. 43(6):664-675.

Laha, S. et al. (Nov. 1988). "Accurate Low-Cost Methods for Performance Evaluation of Cache Memory Systems." *IEEE Transactions on Computers*. 37(11):1325-1336.

Larus, J. R. et al. "EEL: Machine-Independent Executable Editing." *SIGPLAN* Conference on Programming Language Design and Implementation (PLDI). Jun. 1995; pp. 291-300.

Lebeck, A. et al. (Jun. 1994). "Cache Profiling and the SPEC Benchmarks: A Case Study." *IEEE Transactions on Computers*.27(10):15-26.

Maebe, J. et al."DIOTA: Dynamic Instrumentation, Optimization and Transformation of Applications." In Compendium of Workshops and Tutorials. Held in conjunction with International Conference on Parallel Architectures and Compilation Techniques. Sep. 2002.

Magnusson, P. S. et al."SimICS/sun4m: A Virtual Workstation." In Proceedings of the Usenix Annual Technical Conference.119-130. 1998.

Marin, G. et al. "Cross-Architecture Performance Predictions for Scientific Applications Using Parameterized Models." *SIGMETRICS/Performance '04*. In Proceedings of Joint International Conference on Measurement and Modeling of Computer Systems. New York, New York, USA. Jun. 12-16, 2004.

Martonosi, M. et al. "MemSpy: Analyzing Memory System Bottlenecks in Programs." ACM SIGMETRICS in Proceedings on Conference on Measurement and Modeling of Computer Systems. 1992.

Martonosi, M. et al. (Apr. 1995). "Tuning Memory Performance of Sequential and Parallel Programs." IEEE Computer. 28(4):32-40.

Mellor-Crummey, J. et al. "Tools for Application-Oriented Performance Tuning." 15$^{th}$ ACM in Proceedings of the International Conference on SuperComputing. Sorrento, Italy. Jun. 2001; 154-165.

Mohan, T. et al. "Identifying and Exploiting Spatial Regularity in Data Memory References." In Proceedings of the ACM/IEEE Conference on SuperComputing (SC'03).2003;12 pages.

Perelman, E. et al. "Picking Statistically Valid and Early Simulation Points." In Proceedings of the International Conference on Parallel Architectures and Compilation Techniques (PACT). Sep. 2003; 12 pages.

Perelman, E. et al. "Using SimPoint for Accurate and Efficient Simulation." In Proceedings of the SIGMETRIC'03/ACM. San Diego, California, USA. Jun. 10-14, 2003; 2 pages.

Petoumenos, P. et al. "Modeling Cache Sharing on Chip Multiprocessor Architectures." In Proceedings of the 2006 IEEE International Symposium of Workload Characterization, San Jose, California, USA. 2006;160-171.

Petoumenous, P. et al. "STATSHARE: A Statistical Model for Managing Cache Sharing via Decay." In 2006$^{th}$ Workshop on Modeling, Benchmarking and Simulation held in conjunction with the 33$^{rd}$ Annual International Symposium on Computer Architecture. Boston, Massachusetts, USA. Jun. 2006.

Rosenblum, M. et al. (Jan. 1, 1997). "Using the SimOS Machine Simulator to Study Complex Computer Systems." *ACM Transactions on Modeling and Computer Simulation*. 7(1):78-103.

Uhlig, R. et al. "Trap-Driven Simulation with Tapeworm II." 6$^{th}$ International Conference on Architectural Support for Programming Languages and Operating Systems (ASPLOS-VI). San Jose, California, Usa. Oct. 5-7, 1994.132-144.

Vera, X. et al. "Let's Study Whole-Program Cache Behaviour Analytically." In Proceedings of 8$^{th}$ International Symposium on High-Computer Architecture. 2002.

Wood, D. et al. "A Model for Estimating Trace-Sample Miss Ratios." Conference on Measurement and Modeling of Computer Systems. ACM SIGMETRICS Evaluation Review. 91(1).May 21-24, 1991;79-89.

Wunderlich, R. et al. "SMATRS: Accelerating Microarchitecture Simulation via Rigorous Statistical Sampling." In Proceedings of International Symposium of Computer Architecture. 2003.

Zhong, Y. et al. "Miss Rate Prediction Across All Program Inputs." In Proceedings of Parallel Architectures and Compilation Techniques. 2003.

SPEC: Standard Performance Evaluation Corporation. Available at http://www.spec.org; printed Jun. 22, 2010; 2 pages.

Intel VTune: Performance Analyzer 9.1 for Windows and Linux. Available at: http://www.intel.com/software/products/vtune; printed Jun. 22, 2010; 2 pages.

Berg E., et. al., "Fast data-locality profiling of native execution" ACM SIGMETRICS Performance Evaluation Review, vol. 33, No. 1, Jun. 2005, pp. 169-180.

Noordergraaf L., et. al., "SMP System Interconnect Instrumentation for Performance Analysis" Supercomputing, ACM/IEEE 2002 Conference Nov. 16-22, 2002, Piscataway, NJ, USA, IEEE, Nov. 16, 2002, pp. 53-53.

Communication Relating to the Results of the Partial International Search. Issued May 20, 2008. During the prosecution of International Application No. PCT/US2007/013169.

Berg, E. et al., "Low Overhead Spatial and Temporal Data Locality Analysis." Department of Information Technology, Uppsala University, Technical Report 2003-57, Nov. 2003, Uppsala, Sweden.

Berg, E. et al., "StatCache: A Probabilistic Approach to Efficient and Accurate Data Locality Analysis," Department of Information Technology, Technical Report, 2003-58, Uppsala University, Nov. 2003, Uppsala, Sweden.

International Search Report and Written Opinion, mailed May 18, 2009, directed to International Patent Application No. PCT/IB08/03292; 11 pages.

International Preliminary Report on Patentability, mailed Jan. 13, 2009, directed to International Patent Application No. PCT/US2007/013169; 11 pages.

International Preliminary Report on Patentability, mailed May 12, 2009, directed to International Patent Application No. PCT/US2007/084365; 11 pages.

European Office Action, dated Jun. 19, 2009, directed to European Patent Application No. 07 795 719.9; 5 pages.

Office Action for U.S. Appl. No. 11/806,997, mailed Apr. 12, 2011.

Maruyama et al., "Debugging with reverse watchpoint," IEEE QSIC, pp. 116-123, 2003.

Zyulkyarov et al., "Debugging programs that use atomic blocks and transactional memory," ACM PPoPP, pp. 57-66, 2010.

Zhao et al., "Umbra: Efficient and scalable memory shadowing," ACM CGO, pp. 22-31, 2010.

Corliss et al., "Low overhead interactive debugging via dynamic instrumentation with DISE," IEEE HPCA, pp. 303-314, 2005.

Venkataramani et al., "memTracker: an accelerator for memory debugging and monitoring," ACM Trans. on Arch. and Code Optimization, vol. 6, No. 2, article 5, pp. 1-33, 2009.

Spoto et al. "Class analyses as abstract interpretations of trace semantics," ACM Trans. on Prog. Lang. And Sys. vol. 25, No. 5, pp. 578-630, 2003.

* cited by examiner

SYSTEM FOR AND METHOD OF CAPTURING APPLICATION CHARACTERISTICS DATA FROM A COMPUTER SYSTEM AND MODELING TARGET SYSTEM

RELATED APPLICATIONS

The present application claims the benefit of the earlier filing date of U.S. Provisional Patent Application No. 60/810,622, entitled "System For and Method Of Capturing Performance Characteristics Data From A Computer System and Modeling Target System Performance" and filed Jun. 5, 2006 in accordance with 35 U.S.C. §119(e).

RELATED APPLICATIONS

The present application claims the benefit of the earlier filing date of U.S. provisional patent application No. 60/865,152 filed Nov. 9, 2006 in accordance with 35 U.S.C. §119(c), Article 4 of the Paris Convention for the Protection of Industrial Property, and Article 8(1) of the Patent Cooperation Treaty, as applicable.

BACKGROUND OF THE INVENTION

1. Field of the Invention

The present application relates in general to systems, methods and software for analyzing, parallelizing, debugging, optimizing and profiling computer systems and, more specifically to capturing application characteristic data from the execution of a system or multiple systems, and modeling system behavior based on such data.

2. Description of the Related Art

Increasing demands to improve software efficiency with ever-increasing system complexity have dictated the use of tools to evaluate target software operation, identify inefficiencies, suggest and/or implement improvements, optimize software operation, etc. Optimization and profiling tools often embed monitoring code into the target software under scrutiny and/or create a real or simulated (e.g., model) run-time environment that interacts with the target software to analyze its operation. See, for example, "StatCache: A Probabilistic Approach to Efficient and Accurate Data Locality Analysis", E. Berg and E. Hagersten, Technical report 2003-58 Dept. of Information Technology, Uppsala University, Uppsala, Sweden, November 2003, Proceedings of the 2004 IEEE International Symposium on Analysis of Systems and Software (IS-PASS-2004), Austin, Tex., USA, March 2004; "Low Overhead Spatial and Temporal Data Locality Analysis", E. Berg and E. Hagersten, Technical report 2003-57 Dept. of Information Technology, Uppsala University, Uppsala, Sweden, November 2003; and, A Statistical Multiprocessor Cache Model by Erik Berg, Håkan Zeffer, and Erik Hagersten. In Proceedings of the 2006 IEEE International Symposium on Analysis of Systems and Software (ISPASS-2006), Austin, Tex., USA, March 2006, each of which is incorporated herein by reference in its entirety.

Other publications applicable to the related technology include:

STATSHARE: A Statistical Model for Managing Cache Sharing via Decay by Pavlos Petoumenos, Georgios Keramidas, Håkan Zeffer, Stefanos Kaxiras, and Erik Hagersten. In 2006th Workshop on Modeling, Benchmarking and Simulation held in conjunction: with the 33rd Annual International Symposium on Computer Architecture, Boston, Mass. USA, June 2006, 2006.

Modeling Cache Sharing on Chip Multiprocessor Architectures by Pavlos Petoumenos, Georgios Keramidas, Håkan Zeffer, Erik Hagersten, and Stefanos Kaxiras. In Proceedings of the 2006 IEEE International Symposium of Workload Characterization: San Jose, Calif., USA, 2006.

An ideal profiling tool should have low run-time overhead and high accuracy, it should be easy and flexible to use, and it should provide the user with intuitive and easily interpreted information. Low run-time overhead and high accuracy are both needed to efficiently locate bottlenecks with short turn-around time, and the ease-of use requirement excludes methods which need cumbersome experimental setups or special compilation procedures.

It is unfortunately hard to combine all the requirements above in a single method. For example methods based on hardware counters usually have a very low run-time overhead, but their flexibility is limited because hardware parameters like cache and TLB sizes are defined by the host computer system. Simulators on the other hand are very flexible but are usually slow. At worst, they may force the use of reduced data sets or otherwise unrepresentative experiment setups that give misleading results.

There are a variety of methods to perform cache behavior studies. These include simulation, hardware monitoring, statistical methods and compile-time analysis. Compile-time analysis tools [35][8] estimate cache miss ratios by statically analyzing the code and determine when cache misses occur. Compile-time analysis major advantage is that it doesn't require the program to be executed, and can potentially be parameterized in terms of workloads etc. Its drawback is that it is limited to relatively well-structured codes where for example loop limits are known at compile time.

Cache simulators may be driven by instrumented code [13, 14, 20, 21, 23, 26, 27], on source code [17] or machine code levels, or the cache simulator incorporated in a full system simulator [24][22]. Their major limitation is their large slowdown. Simulation-based analysis can possibly combined with sampling (see below) to reduce the runtime overhead.

Cache-sampling techniques include set sampling and time sampling. In time sampling a cache model simulates continuous sub-traces from the complete access trace.

This is explored in papers [11, 15, 18, 19, 36]. It works well for smaller caches, but the need for long warm-up periods makes time sampling less suitable for large caches. The problem of selecting statistically representative samples is explored in Perelman et al. [32] Set sampling is another approach, were only a fraction of the sets in a set-associative cache is simulated [11, 18]. It generally suffers from poor accuracy and can only be used as a rough estimate.

More recently, sampling guided by phase detection has been proposed [31, 37]. The idea is based on the observation that most applications have different phases during their execution. Within each phase, the system performs in a fairly invariant (often repetitive) way. Guided by phase detection algorithms, very sparse samples can still provide a representative behavior for the entire execution. While most work on phase-guided sampling has been targeting detailed pipeline simulation, similar techniques could also be applied to memory system modeling. Cutting down the number of samples for time-sampling of caches could turn out to be especially valuable, since the need to warm the large caches requires so many memory operations per sample. Phase detection could also work well together with our tool. Phase detection could guide us to sample more or less often during the execution which could cut back on out runtime overhead further. The fact that we do not need to warm the caches before our model is valid further speaks in our favor.

Hardware counters are available on most modern computers. Events that can be counted include L1 and L2 cache misses, coherence misses and number of stall cycles. Examples of use include DCPI [1], which uses an advanced hardware support to collect detailed information to the programmer, PAPI [6] which is a common programming interface to access hardware monitoring aids, and several commercial tools [12, 16]. Histogramming and tracing hardware may be used to detect for example cache conflicts [30] and locate problem areas [7]. Their limitations are mainly that only architectural parameters realized on the hardware may be studied, and that it can be hard to capture entities not directly present in the hardware, such as spatial locality. Trap-driven trace generation has also been suggested [34]. It can trace unmodified code, but requires OS modification.

Other approaches to describe and quantify memory behavior include the concept of data streams or strides. Information about data streams can be used to guide prefetching [9][10] and help choose between optimizations such as tiling, prefetching and padding [29]. Abstract cross-platform models for analyzing and visualizing cache behavior exist [25, 5, 38], mostly based on a reuse distance definition similar to the stack distance [28].

[1] J. Anderson, L. Berc, J. Dean, S. Ghemawat, M. Henzinger, S. Leung, D. Sites, M. Vandevoorde, C. Waldspurger, and W. Weihl. Continuous profiling: Where have all the cycles gone? ACM Transactions on Computer Systems, 1997.

[2] E. Berg and E. Hagersten. SIP: Tuning through Source Code Interdependence. In Proceedings of the 8th International Euro-Par Conference (Euro-Par 2002), pages 177-186, Paderborn, Germany, August 2002.

[3] E. Berg and E. Hagersten. StatCache: Low-Overhead Spatial and Temporal Data Locality Analysis Technical report 2003-57, Department of information technology, Uppsala University, Sweden, 2003.

[4] E. Berg and E. Hagersten. StatCache: A probabilistic approach to efficient and accurate data locality analysis. In Proceedings of International Symposium on Analysis of Systems And Software, 2004.

[5] K. Beyls, E. D'Hollander, and Y. Yu. Visualization enables the programmer to reduce cache misses. In Proceedings of Conference on Parallel and Distributed Computing and Systems, 2002.

[6] S. Browne, J. Dongarra, N. Garner, K. London, and P. Mucci. A scalable cross-platform infrastructure for application tuning using hardware counters. In Proceedings of SuperComputing, 2000.

[7] B. Buck and J. Hollingsworth. Using hardware monitors to isolate memory bottlenecks. In Proceedings of Supercomputing, 2000.

[8] C. Cascaval and D. A. Padua. Estimating cache misses and locality using stack distances. In Proceedings of International Conference on Supercomputing, 2003.

[9] T. M. Chilimbi. Efficient representations and abstractions for quantifying and exploiting data reference locality. In SIGPLAN Conference on Programming Language Design and Implementation, pages 191-202, 2001.

[10] T. M. Chilimbi. Dynamic hot data stream prefetching for general-purpose programs. In PLDI, 2002.

[11] T. M. Conte, M. A. Hirsch, and W. W. Hwu. Combining trace sampling with single pass methods for efficient cache simulation. IEEE Transactions on Computers, 47(6):714-720, 1998.

[12] Intel Corporation. Intel VTune Analyzers http://www.intel.corn/software/products/vtune/.

[13] L. DeRose, K. Ekanadham, and J. K. Hollingsworth. Sigma: A simulator infrastructure to guide memory analysis. In Proceedings of SuperComputing, 2002.

[14] A. Eustace and A. Srivastava. ATOM: A flexible interface for building high program analysis tools. In USENIX Winter, pages 303-314, 1995.

[15] S. Ghosh, M. Martonosi, and S. Malik. Cache miss equations: a compiler framework for analyzing and tuning memory behavior. ACM Transactions on Programming Languages and Systems, 21(4):703-746, 1999.

[16] M. Itzkowitz, B. J. N. Wylie, C. Aoki, and N. Kosche. Memory profiling using hardware counters. In Proceedings of Supercomputing, 2003.

[17] R. Fowler J. Mellor-Crummey and D. Whalley. Tools for application-oriented tuning. In Proceedings of the 2001 ACM International Conference on Supercomputing, 2001.

[18] R. E. Kessler, M. D. Hill, and D. A. Wood. A comparison of trace-sampling techniques for multi-megabyte caches. IEEE Transactions on Computers, 43(6):664-675, 1994.

[19] S. Laha, J. A. Patel, and R. K. Iyer. Accurate low-cost methods for evaluation of cache memory systems. IEEE Transactions on computers, 1988.

[20] J. R. Larus and E. Schnarr. EEL: Machine-independent executable editing. In SIGPLAN Conference on Programming Language Design and Implementation, pages 291-300, 1995.

[21] A. R. Lebeck and D. A. Wood. Cache profiling and the SPEC benchmarks: A case study. IEEE Computer, 27(10):15-26, 1994.

[22] S. Devine M. Rosenblum, E. Bugnion and S. Herrod. Using the simos machine simulator to study complex systems. ACM Transactions on Modelling and Computer Simulation, 7:78-103, 1997.

[23] J. Maebe, M. Ronsse, and K. De Bosschere. DIOTA: Dynamic instrumentation, optimization and transformation of applications. In Compendium of Workshops and Tutorials. Held in conjunction with International Conference on Parallel Architectures and Compilation Techniques., September 2002.

[24] P. Magnusson, F. Larsson, A. Moestedt, B. Werner, F. Dahlgren, M. Karlsson, F. Lundholm, J. Nilsson, P. Stenström, and H. Grahn. SimICS/sun4m: A virtual workstation. In Proceedings of the Usenix Annual Technical Conference, pages 119-130, 1998.

[25] G. Marin and J. Mellor-Crummey. Cross-architecture predictions for scientific applications using parameterized models. In Proceedings of Joint International Conference on Measurement and Modeling of Computer Systems, pages 2-13, New York, N.Y., June 2004.

[26] M. Martonosi, A. Gupta, and T. Anderson. Memspy: Analyzing memory system bottlenecks in programs. In Proceedings of International Conference on Modeling of Computer Systems, pages 1-12, 1992.

[27] M. Martonosi, A. Gupta, and T. E. Anderson. Tuning memory of sequential and parallel programs. IEEE Computer, 28(4):3240, 1995.

[28] R. L. Mattson, J. Gecsei, D. R. Slutz, and I. L. Traiger. Evaluation techniques for storage hierarchies. IBM Systems Journal, 9(2):78-117, 1970.

[29] T. Mohan, B. R. de Supinski, S. A. McKee, F. Mueller, A. Yoo, and M. Schultz. Identifying and exploiting spatial regularity in data memory access. In Proceedings of Supercomputing, 2003.

[30] L. Noordergraaf and R. Zak. Smp system interconnect instrumentation for analysis. In Proceedings of Supercomputing, 2002.

[31] E. Perelman, G. Hamerly, M. Van Biesbrouck, T. Sherwood, and B. Calder. Using SimPoint for accurate and efficient simulation. In Proceedings of SIGMETRICS, 2003.

[32] E. Perelman, G. Hamerly, and B. Calder. Picking statistically valid and early simulation points. In In Proceedings of Parallel Architectures and Compilation Techniques, 2003.

[33] SPEC. Standard evaluation corporation http://www.spec.org/.

[34] R. Uhlig, D. Nagle, T. N. Mudge, and S. Sechrest. Trap-driven simulation with tapeworm II. In Proceedings of Architectural Support for Programming Languages and Operating Systems, pages 132-144, 1994.

[35] X. Vera and J. Xue. Let's study whole-program cache behaviour analytically. In Proceedings of $8^{th}$ International Symposium on High-Computer Architecture, 2002.

[36] D. A. Wood, M. D. Hill, and R. E. Kessler. A model for estimating trace-sample miss ratios. ACM SIGMETRICS Evaluation Review, 19(1), May 21-24, 1991.

[37] R. E. Wunderlich, T. F. Wenisch, B. Falsafi, and J. C. Hoe. SMARTS: Accelerating microarchitecture simulation via rigorous statistical sampling. In Proceedings of International Symposium of Computer Architecture, 2003.

[38] Y. Zhong, S. G. Dropsho, and C. Ding. Miss rate prediction across all program inputs. In Proceedings of Parallel Architechtures and Compilation Techniques, 2003.

BRIEF SUMMARY OF THE INVENTION

Embodiments of the invention are directed toward computer system measuring techniques used for estimating the behavior of some application running on a specific piece of hardware or hardware platform. Another object of embodiments of the invention includes identifying a specific problem related to a specific piece of software with respect to one or many different hardware architectures, or to find opportunities to dynamically adjust the functionality of the system to avoid some problems.

More specifically, systems, methods and techniques according to various aspects of the invention may be directed toward targeting efficient techniques for capturing representative characteristics data associated with a piece of software and to using this data for modeling computer hardware in a way that can translate that characteristic into measurements (e.g., "numbers") and/or for identifying problems and opportunities.

Thus, an object of the invention is to provide a tool for the evaluation software that can be used to enhance of the target software. One embodiments of the invention focus on such parameters as Memory Access and identify ways to predict cache misses and their associated slow Memory Access. A preferred embodiment of the invention is a software profiling tool. All forms of caches, including but not limited to disk caches, web caches, the caching of virtual memory to physical memory, TLB translation caches, and the caching functionality of branch target buffers, can be targeted using the described techniques, even though the examples used herein are for ease of illustration alone, centered around caches used in memory systems.

According to one aspect of the invention, embodiments employ statistical modeling as an alternative to or in addition to hardware-counter-based and simulation-based approaches. Such methods have the potential to satisfy demands for flexibility, speed and ease-of-use.

Further, methods according to various embodiments of the invention can be parameterized since they do not rely on the host hardware configuration, are potentially very fast because they can be based on sparse sampling and can also provide a simple and efficient user environment.

Further aspects, features, objectives and advantages of the present invention can be found in the publications "Fast Memory-Locality Profiling of Native Execution", E. Berg and E. Hagersten, SIGMETRICS '05, June 6-10, Banff, Alberta, Canada and "A statistical Multiprocessor Cache Model", E. Berg, H. Zeffer and E. Hagersten, Uppsala University, Department of Information Technology, Uppsala, Sweden, March, 2006, attached to the present disclosure as Appendices A and B, respectively.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

According to one aspect of the invention emphasizing a sampling feature, a method of gathering memory usage information may include the steps of starting the execution of a sequence of operations in response to a program of instructions; selecting a set of the operations to be monitored; recording access information associated with respective operations of the set of operations and identifying one or more memory objects; enabling a trap mechanism to detect one or more next operations accessing one or more of the memory objects; and recording information about the next operations. The program of instructions may be any set of executables, commands, directives, etc. that may be read and control the operation of a computer or other programmable apparatus.

The step of selecting may be accomplished randomly, implement some set of rules, or otherwise target certain types, classes, categories and/or specified operations to be monitored. For example, operations targeted and selected for monitoring may be those (i) requiring some threshold number of machine cycles to execute and/or memory accesses; (ii) subject to some threshold value of repeated executions such as present within an inner loop of a program; (iii) identified as a bottleneck to the execution of multiple subsequent instructions; and/or having some other characteristic that may be relevant to program performance.

According to a feature of the invention, the step of storing access information may further include storing an identity of the one or more memory objects being accessed. The identity may be a relative or absolute memory address of the memory object, a variable name associated with the memory object, a link referencing the memory object, a value or variable name stored in or associated with the memory object, etc.

According to another feature of the invention, the step of enabling a trap mechanism may include enabling a hardware device to provide a signal indicative of the next operations accessing the one or more of the memory objects. This may include using a breakpoint register or some other device that is not directly used by the program and storing a breakpoint corresponding to the one or more of the memory objects in the breakpoint or other register. The hardware device may include logic for detecting an attempted access to a designated portion of or location in memory and, as a result, generating an interrupt such as a hardware interrupt signal, etc.

According to another feature of the invention, the step of enabling a trap mechanism may include enabling an externally provided trap mechanism to detect the one or more next operations accessing the one or more of the memory objects. The externally provided trap mechanism may be in the form of software, such as a shell or operating system, and/or hardware, e.g., a breakpoint register and related logic.

According to another aspect of the invention including a cold miss feature, a method of estimating the amount of memory objects used by a programs sequence may include the steps to gather memory usage information followed by followed by the steps of estimating the fraction of the monitored instruction for which no corresponding next instruction was detected; and multiplying that fraction with the total number of operations executed by the program sequence.

The step of estimating the fraction of monitored instructions for which no corresponding next instruction may be performed by assessing the number of initiated trap mechanisms that still have not found any other instruction accessing the same memory object as the corresponding selected operation when the end of the program sequence is reached.

According to another feature the memory space used by the program may be estimated by identifying the monitored instruction for which no corresponding next instruction was detected and compute the sum their memory objects sizes.

According to another aspect of the invention including a random replacement feature, a method of estimating cache miss rate for a cache system including the steps of: executing a sequence of accesses to a memory system; recording reuse distance information for a selected fraction of memory accesses of this sequence; and solving an unknown miss rate variable from an equation equating the total number of memory accesses multiplied by the unknown miss rate, with the number of unique memory objects in the sequence plus the sum of the miss probabilities for the selected of memory accesses divided by the fraction of memory accesses for which reuse distance information was recorded.

Reuse distance for one memory operation may be measured as the number of memory operations that have been performed since the memory object it accesses was last accessed. The number of unique memory objects accessed in the sequence may be estimated by the number of cold misses in the sequence.

According to another aspect of the invention incorporating stack distance features, a method of estimating a number of unique memory objects touched for a segment of a program of instructions include the steps of; executing the program and estimating a representative reuse distance distribution for memory operations of the studied segment; estimating the amount of memory operation performed during the segment; for each number between that amount and one, use the distribution to calculate the probability a memory operation of has a reuse distance larger than the number; and add all those probabilities together. The number of unique memory object touched is sometimes referred to as stack distance.

A representative reuse distribution may be comprised of the a histogram based on reuse distance from a randomly chosen set of memory operations executed during, or reasonably close to, the studied segment. In some situations, the reuse distribution of memory operations collected during the entire execution may be sufficient for this task. For each bucket in the histogram, the population number recorded is divided by the fractions between the number of randomly chosen memory operations and the total number of memory operations executed during the timeframe from which the random selection was made.

In one feature of the invention the ability to estimate the number of unique memory objects accessed during a segment of the execution may be used in the following steps to estimate the miss rate of an LRU cache: finding the smallest reuse distance value for which the number of unique memory object is larger than the number of memory objects that can be stored in the cache; and calculating the fraction of memory operations of said reuse distribution with a reuse value larger than said number.

According to another aspect of the invention, an apparatus may provide the functionalities and perform the methods and steps according to the above described features and aspects of the invention as further set forth below by way of example.

Thus, according to another aspect of the invention, an apparatus for gathering memory usage information may include a processor operating to execute a sequence of operations in response to the program; selecting logic for selecting a set of operations from the sequence of operations; monitoring logic for monitoring respective operations of the set of operations; a first memory storing access information associated with respective operations of the set of operations including an identify one or more memory objects being accessed by respective ones of the set of operations; a trap mechanism operable to detect one or more next operations accessing one or more of the memory objects; and a second memory storing access information about the next operations. The processor may be part of, for example, a conventional computer such as a personal computer, workstation, mainframe, etc, capable of reading and executing the program of instructions. The selecting and/or monitoring logic may be software, firmware, and/or hardware, or any combination thereof capable of performing or causing to be performed the recited steps and/or operations. The first and second memories may be the same or different portions of one or more physical or virtual devices, e.g., registers or memory locations, etc.

According to a feature of the invention, the selecting logic may be further operable to enable an imprecise hardware trap with a maximum skid of S operations to signal S operations before one of the next operations is executed, and to advance the execution using a technique having less skid, until the one next operation is reached.

According to another feature of the invention wherein the first memory stores the access information about the selected set of operations, such information may include one or more pieces of information selected from the group consisting of: (i) identities of the selected operations; (ii) identities of the memory objects; (iii) memory addresses being accessed; (iv) identities of memory operations following next after respective ones of the selected set of operations; and (v) identities of memory operations preceding before respective ones of the selected set of operations.

According to another feature of the invention wherein the first memory stores the access information about the next operations, such information may include one or more pieces of information selected from the group consisting of: (i) identities of the next operations; (ii) identities of the memory objects; (iii) memory addresses being accessed; (iv) identities of memory operations following next after respective ones of the next operations; and (v) identities of memory operations preceding before respective ones of the next operations.

According to another feature of the invention, the apparatus may further include estimating logic (e.g., programming, software, hardware, firmware, or other means for performing or causing to be performed the recited steps or processes) for estimating an amount of memory objects used by the sequence of instructions including estimating logic for estimating a fraction of the monitored instructions for which no next instruction is detected; and a multiplier for multiplying the fraction with a total number of the operations executed by the sequence of instructions.

According to another feature of the invention, the apparatus may further include estimating logic for estimating an amount of memory space used by the sequence of operations including identifying logic for identifying the monitored instruction for which no the next instruction is detected; and an adder for summing each memory object size accessed for each the identified instruction to form a total.

According to another feature of the invention, the apparatus may further include estimating logic for estimating an amount of cache space used by the sequence of operations wherein a memory object size is equal to a cache line size of the cache, the step of estimating further including estimating logic for estimating a fraction of the monitored instruction for which no next instruction is detected; and a multiplier for multiplying the fraction with a total number of the operations executed by the program sequence and the memory object size of the cache.

According to anther feature of the invention, an apparatus or estimating a cache miss rate for a cache system may include a processor for executing a sequence of accesses to a memory system; a memory storing reuse distance information for a selected fraction of the memory accesses of the sequence; and logic for solving an unknown miss rate variable from an equation equating the total number of memory accesses multiplied by the miss rate, with a number of unique memory objects in the sequence plus a sum of the miss probabilities for the selection fraction of memory accesses divided by the fraction.

According to another feature of the invention, an apparatus for estimating a number of unique memory objects accessed for a segment of a program of instructions may include a processor for executing the program and estimating a representative reuse distance distribution for memory operations of the segment; estimating logic for estimating an amount of memory operations performed during the segment; logic using the reuse distance distribution to calculate, for each natural number between the amount and the number one, a probability a memory operation of the distribution has a reuse distance larger than the natural number; and an adder for adding all the probabilities together.

According to another aspect of the invention, a computer readable medium may include code including instructions for implementing and/or performing the methods, steps and actions set forth above. Thus, by way of example, according to another aspect of the invention, a computer readable medium may include code for gathering memory usage information, the code including instructions for executing a sequence of operations in response to a program of instructions; selecting a set of the operations to be monitored; storing access information associated with respective operations of the set of operations including an identity of corresponding operations accessing each of one or more memory objects; enabling a trap mechanism to detect one or more next operations accessing one or more of the memory objects; and recording information about the next operations. The computer readable medium may be, for example, random access memory, read only memory, permanent and removable magnetic and/or optical storage devices and media, etc.

According to another aspect of the invention, a computer readable medium may include code for gathering memory usage information, the code including instructions for starting to execute a sequence of operations in response to the program; selecting a set of operations from the sequence of operations; monitoring respective operations of the set of operations; recording access information associated with respective operations of the set of operations and identifying one or more memory objects being accessed by respective ones of the set of operations; enabling a trap mechanism operable to detect one or more next operations accessing one or more of the memory objects; and recording access information about the next operations.

According to a feature of the invention, the code for selecting a set of operations further may include code for enabling an imprecise hardware trap with a maximum skid of S operations to signal S operations before one of the next operations is executed, and to advance the execution using a technique having less skid, until the one next operation is reached.

According to another feature of the invention, code may be included for estimating an amount of memory objects used by the sequence including instructions for estimating a fraction of the monitored instructions for which no next instruction is detected; and multiplying the fraction with a total number of the operations executed by the sequence of instructions.

According to another feature of the invention, code may be included for estimating an amount of memory space used by the sequence including instructions for identifying the monitored instruction for which no the next instruction is detected; and summing to form a total of each memory object size accessed for each the identified instruction.

According to another feature of the invention, code may be included for estimating an amount of cache space used by the sequence of operations wherein a memory object size is equal to a cache line size of the including instructions for estimating a fraction of the monitored instruction for which no next instruction is detected; and multiplying the fraction with a total number of the operations executed by the program sequence and the memory object size of the cache.

According to another aspect of the invention, a computer readable medium may include code for estimating a cache miss rate for a cache system, the code including instructions for executing a sequence of accesses to a memory system; recording reuse distance information for a selected fraction of the memory accesses of the sequence; and solving an unknown miss rate variable from an equation equating the total number of memory accesses multiplied by the miss rate, with a number of unique memory objects in the sequence plus a sum of the miss probabilities for the selection fraction of memory accesses divided by the fraction.

According to another aspect of the invention, a computer readable medium may include code for estimating a number of unique memory objects accessed for a segment of a program of instructions, the code including instructions for executing the program and estimating a representative reuse distance distribution for memory operations of the segment; estimating an amount of memory operations performed during the segment; for each natural number between the amount and the number one, using the reuse distance distribution to calculate a probability a memory operation of the distribution has a reuse distance larger than the natural number; and adding all the probabilities together.

According to an aspect of the invention, a method of estimating cache utilization information for a program of instructions includes the steps of gathering memory usage information from an execution of the program of instructions for at least two memory object sizes; estimating a miss probability for each of the memory object sizes; and estimating a cache utilization based on a ratio between the miss probability for the two memory object sizes.

According to a feature of the invention, one of the memory object sizes corresponds to a cache line size of a modelled system.

According to another feature of the invention, one of the memory object sizes corresponds to a data size accessed by a plurality instructions of the program of instructions.

According to another feature of the invention, one of the memory object sizes corresponds to a data size accessed by each instruction of the program of instructions.

According to another feature of the invention, one of the memory object sizes corresponds to a fixed object size that is smaller than a cache line size of the modelled system.

According to another aspect of the invention, a method of gathering memory usage information for a multithreaded program of instructions includes the steps of executing a sequence of operations for each thread of the multithreaded program of instructions in response to the program of instructions; selecting a set of operations from the sequences of operations; monitoring respective operations of the set of operations; recording access information associated with respective operations of the set of operations and identifying one or more memory objects being accessed by respective ones of the set of operations; enabling a trap mechanism operable to detect one or more next operations accessing one or more of the memory objects; and recording access information about the next operations.

According to another feature of the invention, a thread triggering the trap mechanism is different from a thread associated with and initiating the step of monitoring, and wherein access information about the thread triggering the trap mechanism is recoded in performance characteristic data.

According to another feature of the invention, the trap mechanism remains active until an operation from the thread for which the monitored operation was initiated triggers a watch point mechanism.

According to another feature of the invention, a watch point triggering mechanism remains active until an operation from the thread for which the monitored operation was initiated triggers the watch point triggering mechanism and wherein only a limited number of traps from threads different than from which the monitored operation was initiated are recorded.

According to another feature of the invention, a thread triggering the trap mechanism, that is different from the thread for which the monitored operation was initiated, is used as an indicator for a communication miss if the triggering operation is of a write type.

According to another aspect of the invention, a method of detecting communication misses includes the steps of executing a sequence of operations for each thread of a multithreaded program of instructions in response to a program of instructions; selecting a set of operations from the sequences of operations; monitoring respective write operations of the set of operations; recording access information associated with respective operations of the set of operations and identifying one or more memory objects being accessed by respective ones of the set of operations; enabling a trap mechanism operable to detect one or more next operations accessing one or more of the memory objects; and recording access information about the next operations, wherein a thread triggering the trap mechanism is different from a thread associated with and initiating the step of monitoring, and wherein access information about the thread triggering the trap mechanism is recoded in performance characteristic data.

According to another aspect of the invention, a method of detecting false sharing misses includes the steps of executing a sequence of operations for each thread of a multithreaded program of instructions in response to a program of instructions; selecting a set of operations from the sequences of operations; monitoring respective write operations of the set of operations; recording access information associated with respective operations of the set of operations and identifying one or more memory objects being accessed by respective ones of the set of operations; enabling a trap mechanism operable to detect one or more next operations accessing one or more of the memory objects; recording access information about the next operations and the identity within the memory objects being accesses by each thread; and determining that the threads co no access the same date; wherein a thread triggering the trap mechanism is different from a thread associated with and initiating the step of monitoring, and wherein access information about the thread triggering the trap mechanism is recoded in performance characteristic data.

According to another aspect of the invention, a method of detecting communication misses includes the steps of executing a sequence of operations for each thread of a multithreaded program of instructions in response to a program of instructions; selecting a set of operations from the sequences of operations; monitoring respective operations of the set of operations; recording access information associated with respective operations of the set of operations and identifying one or more memory objects being accessed by respective ones of the set of operations; enabling a trap mechanism operable to detect one or more next write operations accessing one or more of the memory objects; and recording access information about the next operations, wherein a thread triggering the trap mechanism is different from a thread associated with and initiating the step of monitoring, and wherein access information about the thread triggering the trap mechanism is recoded in performance characteristic data.

According to another aspect of the invention, a method of detecting false sharing includes the steps of executing a sequence of operations for each thread of a multithreaded program of instructions in response to a program of instructions; selecting a set of operations from the sequences of operations; monitoring respective operations of the set of operations; recording access information associated with respective operations of the set of operations and identifying one or more memory objects being accessed by respective ones of the set of operations; enabling a trap mechanism operable to detect one or more next write operations accessing one or more of the memory objects; recording access information about the next operations and an identify of data within the memory objects accessed by each thread, and determining that the threads do not access the same data, wherein a thread triggering the trap mechanism is different from a thread associated with and initiating the step of monitoring, and wherein access information about the thread triggering the trap mechanism is recoded in performance characteristic data.

According to another aspect of the invention, a method of estimating an amount of false sharing for a program of instructions includes the steps of gathering memory usage information from an execution of the program of instructions for at least two memory object sizes; estimating an amount of communication misses for each of the memory object sizes; and estimating a false sharing responsive to a number of communication misses detected for a specific instruction for a memory object satisfying a predetermined memory object size criteria. According to a feature of the invention, the estimating step excludes consideration of memory objects having a smaller memory object size than the predetermined memory object size criteria.

According to another aspect of the invention, a method of estimating communication efficiency for a program of instructions includes the steps of gathering memory usage information for at least two memory object sizes; estimating an amount of communication misses for each of the memory object sizes; and estimating a communication efficiency based on a ratio between the estimated misses for the two memory object sizes.

According to another aspect of the invention, a method of estimating a fraction of shared cache used by each application sharing a cache includes the steps of for each application, estimating a number of fetches per time unit as a function of cache size; finding a working point for each application, such that an amount of cache space used for each application is proportional to their respective fetch rate and a total amount of cache space used by the applications is equal to a shared cache space.

According to a feature of the invention, the working point is found using iterative methods.

According to another feature of the invention, a number of fetches per time unit is calculated based on memory usage information gathered during an execution of each application.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

For a more complete understanding of the present invention, reference is now made to the following descriptions taken in conjunction with the accompanying drawing, in which.

DESCRIPTION OF A PREFERRED EMBODIMENT

The ensuing description provides exemplary embodiments only, and is not intended to limit the scope, applicability, or configuration of the invention. Rather, the ensuing description of the exemplary embodiments will provide those skilled in the art with an enabling description for implementing an example embodiment of the invention. It should be understood that various changes may be made in the function and arrangement of elements without departing from the spirit and scope of the invention.

System Overview

Figure 1:
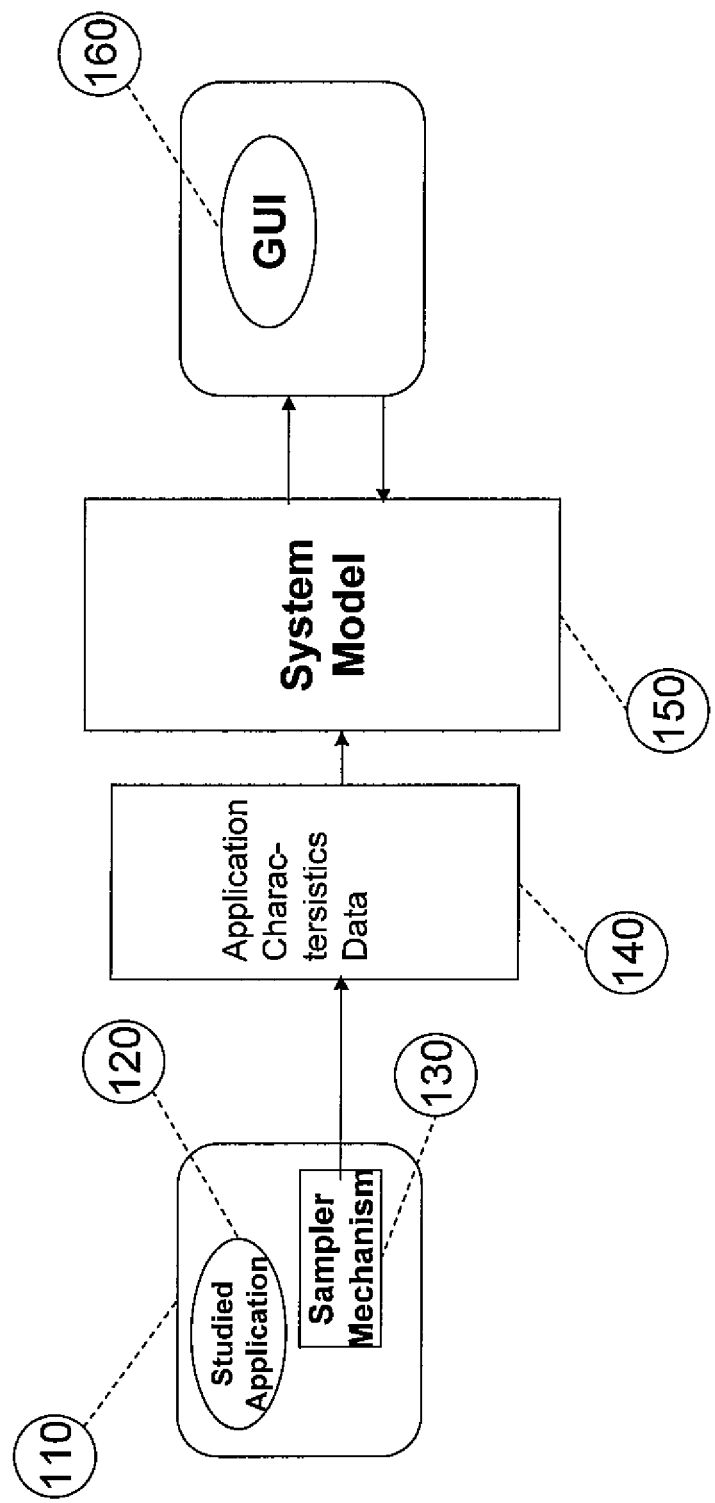
FIG. 1 is a block diagram of a system for gathering characteristics of a program using a sampler method and wherein the captured characteristics may be used as input to a system model.

FIG. 1 is a diagram of a system according to an embodiment of the invention for measuring thereof a specimen or target software or other code to be analyzed. Host Computer System 110 may be used to execute a sequence of instructions in response to a program, a group of programs or an entire system, that is the target of the analysis, here designated as Studied Application 120, for which memory usage information should be captured. The memory usage information is gathered by a sampler method, represented as Sampler Mechanism 130, and collected as Application Characteristic Data (ACD) 140. The sample method includes selective monitoring of system parameters which can be used to estimate cache usage, cache hit/miss ratio, overall software execution time, etc. ACD may for example be stored as a data file on the host Computer System 110 and may be used as input to the System Model 150, which can model the behavior of a system, such as Host Computer System 110 or other computer systems. System Model 150 determines the characteristics of the Studied Application with respect to some modeled computer system. The characteristics can be provided for display using a suitable Graphical User Interface, 160, as depicted in FIG. 1, or any other means of transferring such information. The characteristics can also be fed directly to the runtime system of Studied Application 120 to allow for on-line and/or real-time adjustments; to the operating system of Host Computer System 110: to the compiler used to produce the binary of Studied Application 120 (e.g., machine executable object code); to a virtualization layer that may be controlling system resources; or, to any other piece of the system used to produce and manage the Studied Application or any aspect of the Host Computer System it is running on. In one embodiment of the described system, the gathering of memory usage information ACD is performed at runtime while system modeling may be performed as an off-line activity.

Gathering Memory Usage Information

Figure 2:
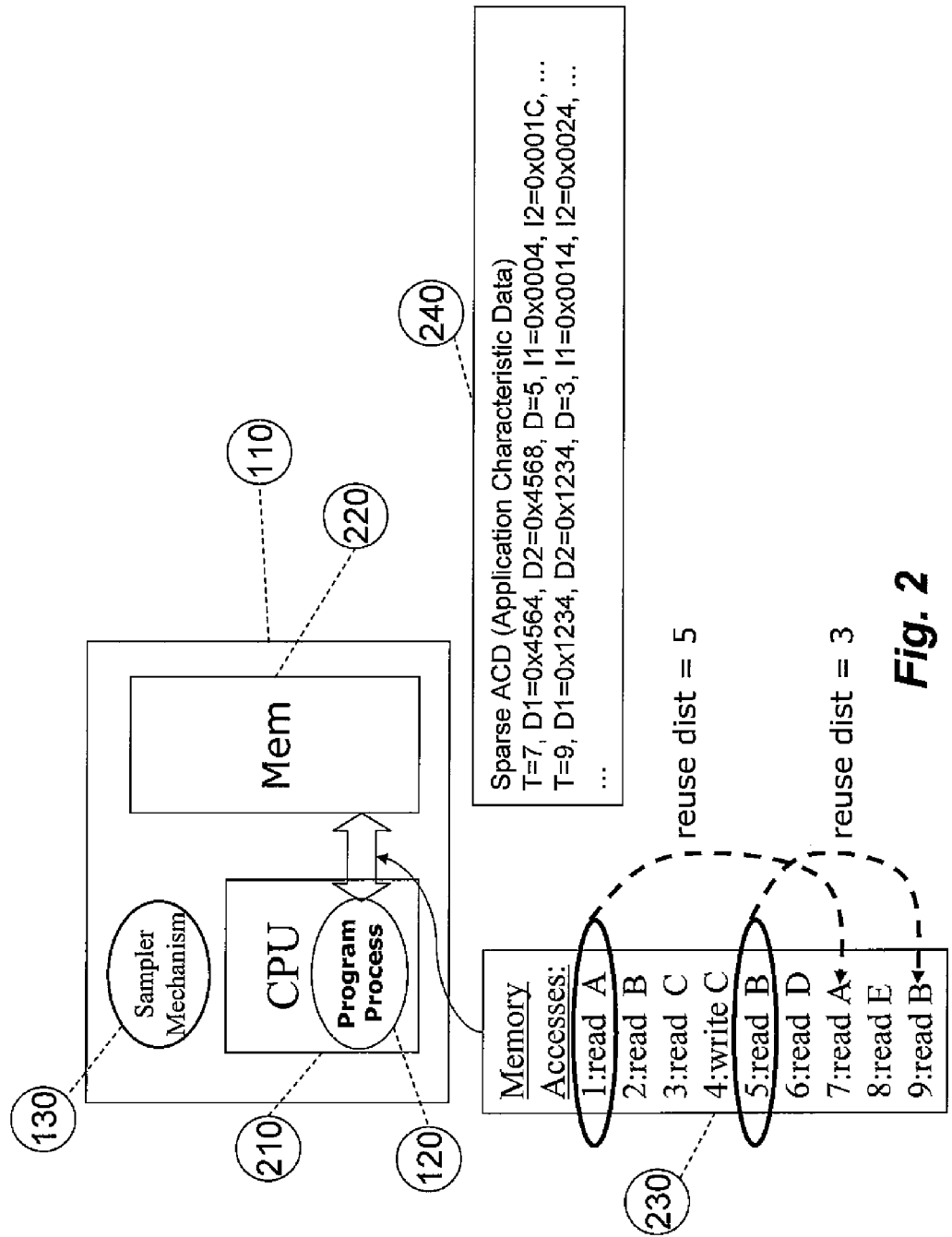
FIG. 2 is a diagram illustrating a sparse selection of samples chosen from a stream of Memory Accesses and examples of different types of characteristic data that may be recorded.

Information of memory usage of Studied Application 120 (i.e., ACD 140) is gathered by a Sampler Mechanism that monitors various system parameters including, but not limited to, for example, properties of Memory Access, etc. The activity of such a Sampler Mechanism is shown in FIG. 2. Host Computer System 110 includes at least one Central Processing Unit, CPU 210 and a Memory System 220. Memory System 220 of the Host Computer System 110 may include one or more data and instruction caches as shown in further detail in FIG. 3. Studied Application 120, for which the ACD is to be captured, is assumed to be currently executing on or under the direction of CPU 210 and continuously producing a stream of Memory Accesses 230 to Memory System 220). For ease of illustration and explanation, in the present example, nine Memory accesses are shown, each representing either a read or write access to one of five different Memory Objects of Memory System 210, referenced to as A-E. A Memory Object (i.e., data referenced for retrieval or storage by an operation of memory access type) may be of a fixed size, for example corresponding to the cache line size, or may be of different sizes.

While it would be possible to collect information about every Memory access in the ACD, such a Sampling Method would be very slow and produce a vast amount of data in ACD. A faster method according to embodiments of the present invention is to only collect ACD from a relatively small subset of the accesses to Memory System 220, the data from this sampling method herein references as Sparse Application Characteristic Data. The terms Sparse Application Characteristic Data and ACD used in this document can mean both full ACD information as well as sparse ACD information.

Such sparse sampling is shown for the Memory Access of FIG. 2, where the Sampling Mechanism is configured to sample Memory Access number 1 and 5 (e.g., accesses made during sampling events 1 and 2). Since only a sparse subset of Memory Access is monitored, a substantial amount of memory usage data may be gathered for each Memory Access studied, here called Sample. In one embodiment, the Sparse Application Characteristic Data is collected in completely or effectively random or pseudorandom way. If the Samples are selected in such a way that Memory Access produced by the execution event of one instruction are sampled with a higher probability than Memory Access produced by the execution event of another instruction, some types of conclusions drawn by the System Model may not be representative of actual program execution. Other embodiments include Sampling systems with a more biased selection of operations to be monitored.

One parameter targeted by embodiments of the present invention is Reuse Distance as computed based on sampled Memory Accesses of each sample, i.e., the duration between the sampled Memory Access and the next Memory Access directed to the same Memory Object in the Memory System. It should be noted that many different time units would be possible for implementing the Methods described herein for purposes of the present illustration: including but not limited to the number of instructions; wall-clock time (e.g., real-time); or system time. In one preferred embodiment, duration is measured by counting the number of intervening memory instruction.

For example, referring to FIG. 2 and Memory Access stream 230, the first and the fifth access are randomly or otherwise selected to be sampled. For the first of these Samples the Reuse Distance is five, since there are five Memory Accesses between the sampled access and the next Memory Access touching the same Memory Object (object A at time 1 and next at time 7). The Sparse ACD 240, shown to be recorded in FIG. 2, is but one example of information that may be collected in the ACD for each of the two samples including a timestamp for the second access to Memory Object A (T=7), the address accessed during the first access to Memory Object A (D1=0x4564), the address accessed the second time Memory Object A was referenced (D2=0x4568), the Reuse Distance between the Memory Access (D=5), the address of the first instruction accessing Memory Object A (I1=0x0004), and the address of the second instruction accessing Memory Object A (I2=0x001C). The corresponding information is also shown for the second Sample with reference to Memory Object B (T=9, D1=0x1234, D2=0x1234, D=3, I=0x0014, I2=0x0024). Examples of other types of information that mat be collected, include but are not limited to, I1+: the address of the next Memory Access instruction following I1, I1−: the address of the Memory Access instruction preceding I1, CID: the identity of the current context, and CS: the call stack information with hierarchical information about the instructions from which calls were made which led to the invocation of the current function/procedure for each of the instruction addresses of the sample, etc. It should be noted that the type of information collected shown for each sample is just one of many possible combinations of information that may be collected in an ACD.

Sampling Techniques

There are several options for the implementation of Sparse Sampling Methods. One realization is based on a hardware-based implementation that randomly collects samples and records the corresponding ACD information.

Another implementation uses an instrumentation-based approach based on code instrumentation, where some of the Studied Application's instructions that accesses memory has been expanded into several instructions which add the additional functionality to perform the sample selection as well as recording the necessary ACD information for each sample. Examples of such rewriting techniques include, but are not limited to, static rewriting techniques and a dynamic rewriting technique. One technique for such an instrumentation-based sampling selection approach may be implemented as a counter which is initialized to the number of memory instructions remaining until the next sample should be taken. The counter is decremented each time a new memory instruction is executed, after which the counter's value is checked to determine if it is time to take a sample. Taking a sample mechanism may include the steps of recording of the necessary ACD data and enabling a trap for some Memory Objects in such a way that the next access to the memory objects will cause further actions of the sampling mechanism and possible collection of more ACD data.

Collection of ACD data may require special processing considerations. For example, measuring the reuse distance of a sample may require recording the corresponding data address and comparing each following memory instruction with this value in order to determine if the same data has been referenced again. If so, the number of times the counter has been incremented since the corresponding sample was initiated will determine its reuse distance. Someone skilled in the art realizes that there are many efficient alternatives for implementation of the comparison mechanisms searching the Memory Object addresses of all active watchpoint, including some hashing techniques.

Instead of explicitly implementing the trap mechanism, some externally provided trap mechanisms. The externally provided trap mechanism may be in the form of software, such as a shell or operating system, and/or hardware, e.g., a breakpoint register and related logic.

Still another method to collect ACD uses a trap-based implementation, relying on hardware counters and trap mechanisms often present in modern CPUs to implement the sampling selection as well as recording of ACD associated with the samples. Modern CPUs often have hardware counters configured or configurable to monitor various events, such as the number of memory instructions executed or the number of CPU stall cycles that have occurred. Each time such a counter reaches some maximum value or otherwise reaches some predetermined threshold, an overflow trap is generated. Such a memory instruction counter can be initiated in such a way that a trap is generated exactly when a new sample is to be taken. This method allows the Sample Mechanism 130 in FIG. 2 to be "woken up" in response to a counter-initiated trap event using such a software trap handler. In response to the counter-initiated trap event, the trap handler can determine access information, such as the address of the Memory Object being referenced or "touched" by sampled memory instruction, the address of the instruction performing the access and the point in time the attempted access was initiated or occurred.

The trap mechanism can also be enabled as a so-called Watch Point for the Memory Object containing the accessed data. A Watch Point is a mechanism often supported by an operating system, and may be supported and/or implemented in hardware. Enabling such a trap mechanism of the Watch Point will ensure a software trap is generated the next time that Memory Object with a specified address and size is touched. This way, Sample Mechanism 130 of FIG. 2 will also be woken (e.g., activated) the next time that Memory Object is touched. At such time the handler can determine the access information, such as address of the instruction making this second access to the Memory Object, and the address of the part of the Memory Object being touched. The reuse distance between the sample event and this next access to the Memory Object may also be determined by assessing the value of a hardware counter counting the number of memory instruction when the Watch Point was initiated as well as when the Watch Point trap occurred. Many alternative ways for enabling trap mechanisms to detect the next access to a Memory Object, similar to a Watch Point, exist. One method is to alter the representation of the data such that an access to it could be recognized. Examples of this include setting a recognizable signature in the EEC code associated with the Memory Object or writing some value to some other bits associated with the Memory Object which could cause a trap or be recognized by any other means by some future access.

Compensating for Skid

The exact functionality of the hardware counters and the trap mechanism available in many processors sometimes requires more elaborate methods to perform the trap-based sampling. One problem that arises is the skid property of the overflow trap, i.e., the trap may occur several cycles after the instruction generating the counter overflow. For example, an interrupt routine responsive to an overflow condition may be delayed so that subsequent interrupt processing is not timely. This is referred to as an imprecise hardware trap. To further complicate the picture, skidding often has a property that makes it more likely to stop on certain instructions than others after such an event. So, using the overflow trapping mechanism would violate the randomness properly used by the modeling method according to preferred embodiments of the present invention.

One method to overcome the skidding problem is to initialize a counter (hardware or software implemented) to generate a corresponding trap several memory cycles in advance of when a target sample is to be taken, i.e., trap "too early". Turning again to FIG. 2, the sampling mechanism intending to sample instruction 5 would instead initialize the hardware counter to generate a trap for the $2^{nd}$ Memory Access of Memory Access stream 230. The skid phenomenon might result in the next ($3^{rd}$) instruction executing before the trap is generated and the sampling mechanism can be activated, but prior to the targeted fifth instruction. The sampling mechanism would read the hardware counter to determine that the sample should be taken exactly two memory instruction further down in the memory instruction stream (5−3=2). The sample mechanism would thereupon implement a more careful, but also may be more costly, method than the counter overflow trap, such as instruction single-stepping, to advance to the chosen $5^{th}$ instruction of the instruction stream.

Figure 8:
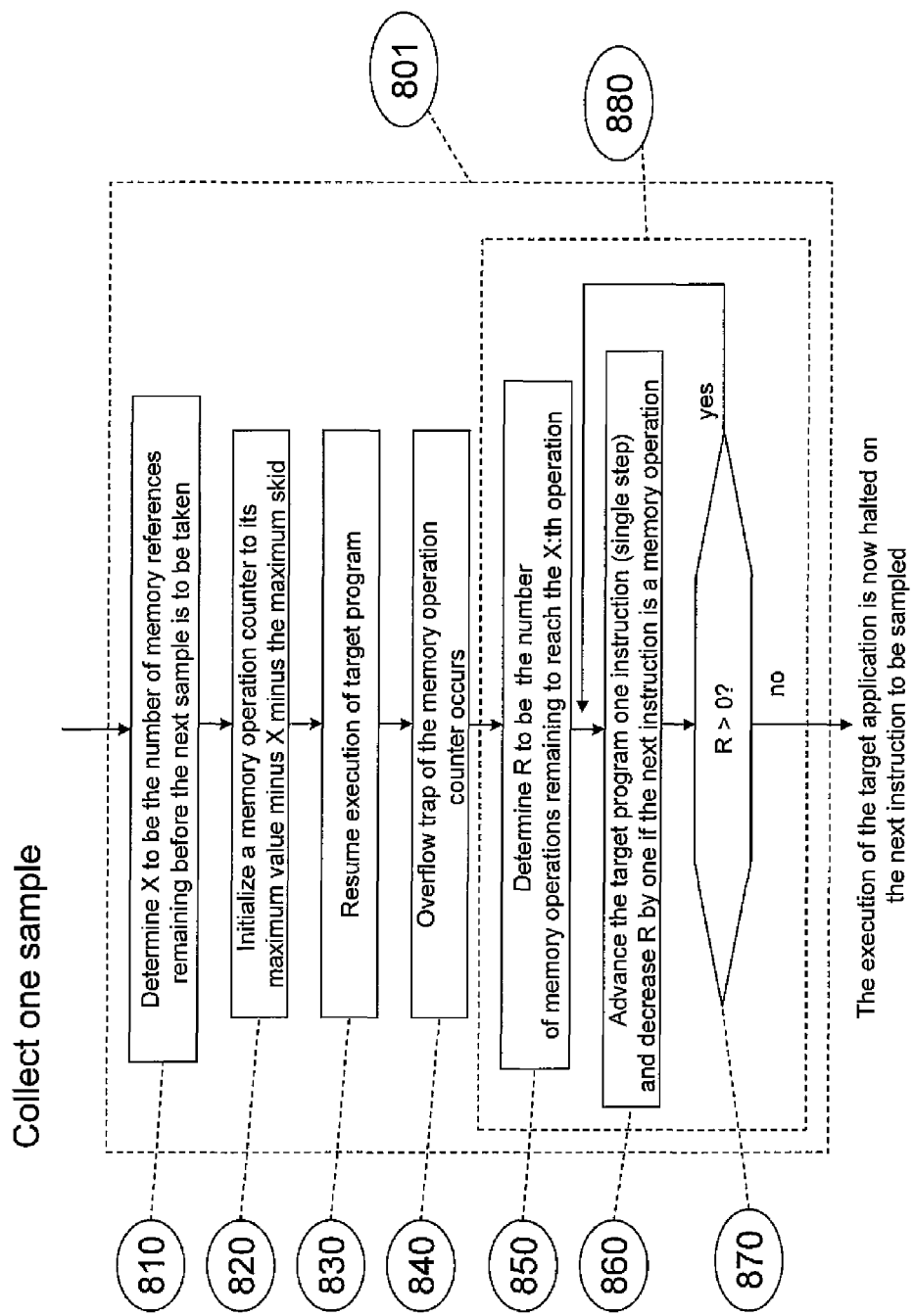
FIG. 8 is a flow chart of a method for randomly selecting one sample using a combination of hardware traps and single stepping.

A more detailed example of one method to handle the skid problem can be found in FIG. 8.

At step 810, the number of remaining Memory Access X before a sample is to be collected is determined. One way to determine X is to generate a random number between one and twice an expected average sample rate (the average ratio between monitored operations and the total number of operations), which yields a uniformly distributed random value between one and twice the designated sample rate. All other known distributions functions, such as Poison and exponential distributions, may also be candidates in this step. Furthermore, it is sometimes preferable to vary the sample rate over time, for example collecting several samples close in time to form a Sample Batch, and to place the Sample Batches further in time. Such consideration may also be incorporated in this step.

Step 820 shows one way to calculate the number of Memory Access that can safely be executed before a trap event occurs, while still guaranteeing that the corresponding trap will halt the execution of the Studied Application before the memory instruction that step 810 decided to sample, and to enable such a trap mechanism. The trap event may be based on a memory operation counter that generates an overflow trap when it reaches its maximum value, or some other available mechanisms. In one embodiment, a different kind of counter, such as an instruction counter, memory read counter or timer interrupt, may be used. It should be noted that many more sample time units than the number of Memory Access would be possible for implementing the Methods described herein for purposes of the present illustration: including but not limited to the number of instructions; wall-clock time (e.g., real-time); or system time. Examples in accordance with preferred embodiments of the present invention where the unit corresponding to the number of Memory Accesses is used, such as where the reuse distance is estimated, other kinds of suitable time units or equivalent temporal or sequence indicators may also be used, such as the time units listed above.

At step 830 the execution of the Studied Application is resumed in a "run" mode of operation wherein the Studied Application is executed normally.

Step 840 occurs at the point in time when the trap event has occurred plus the time the skid has added. In one embodiment of this step, the execution of the Studied Application is halted and a trap handler has been activated and will perform step 880, which is an alternative way of advancing the execution in a more controlled manner which may be realized as sub-steps 850 through 870.

At step 850 it is determined how many more operations should be performed before a sample is collected. This could be done by reading the memory operation counter to determine exactly how many more memory operations should be executed before the sample is taken. Another embodiment would be to calculate a random number according to some distribution function to randomly decide how many more memory operations should occur before a sample is taken.

At step 860 the execution is advanced by some known quanta. One implementation would be to advance the execution one instruction, while another possibility would be to advance the execution one memory operation. Other options include, but are not limited to, advancing several instructions or memory operations.

At step 870 it is determined if the correct (e.g., desired) number of memory operations have been executed. If not, some means of executing more memory instructions is invoked. One way of executing more instructions is to go back to step 860 again along the "yes" leg. If step 870 determines that the right number of instructions has been executed, the execution is halted on the memory operation to sample. Another embodiment would be to perform the sampling at this point without stopping the execution.

Multistepping

Figure 9:
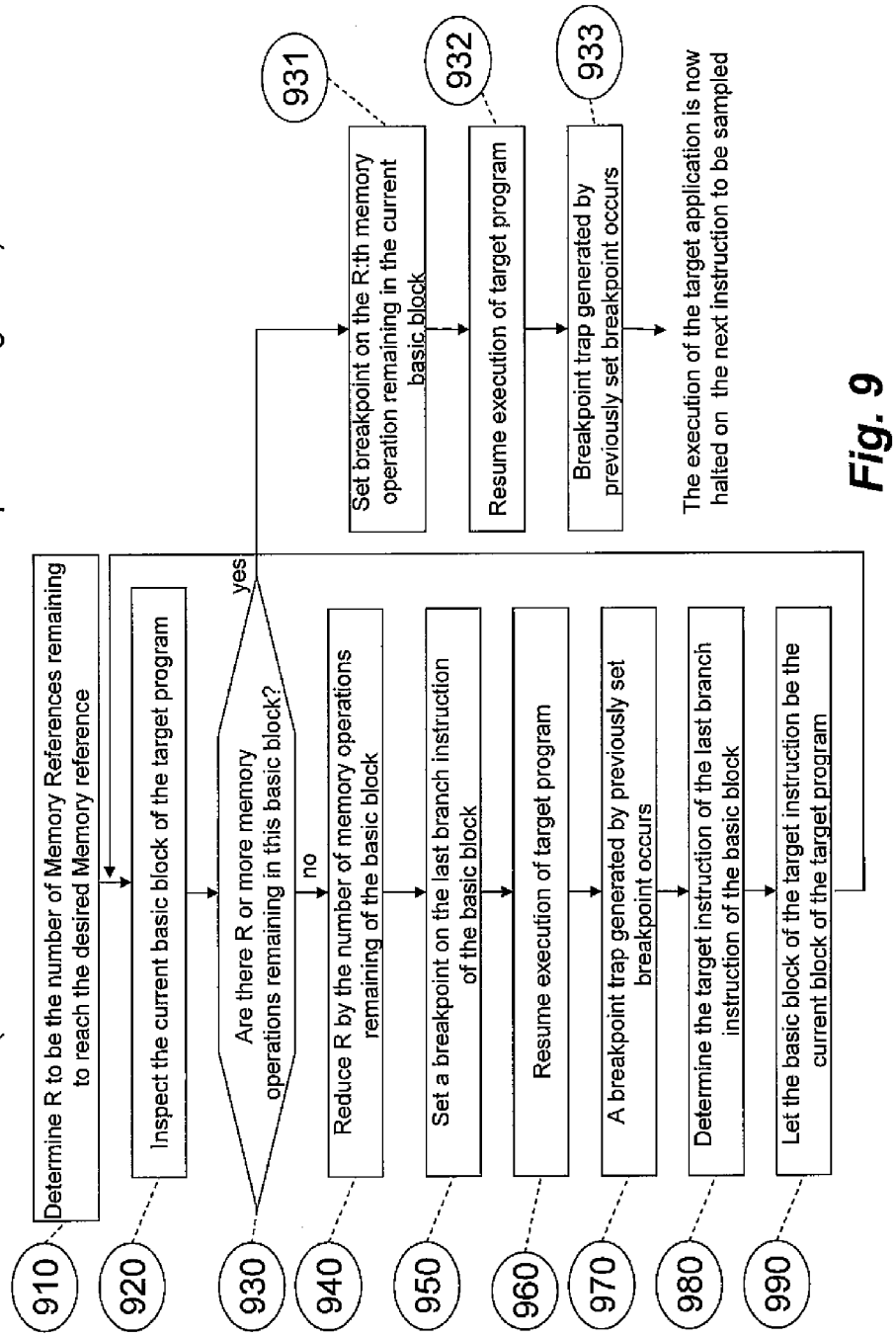
FIG. 9 is a flow chart of a method for an alternative to the single-stepping techniques of FIG. 8.

In one embodiment, step 880 is realized by the steps shown by the flow diagram of FIG. 9 illustrating a particularly efficient method for exactly advancing to the chosen memory operation.

At step 910 it is determined how many more operations of a certain type should be performed before a sample is collected. This may be implemented using similar techniques to step 850 of FIG. 8. The number of remaining operations is referred to as R.

At step 920 the instructions of the current basic block are inspected. This may be done by a disassembly function where the identity of each instruction in the basic block is decoded. At this step the number of operation of different type of the current basic block may be counted.

At step 930 it is determined if the current basic block contains R or more memory operations. If so, step 931 is the next step, as show by the right leg of 930.

At step 931 the R:th operation of the designated type in the current basic block is marked in a certain way. One way to do this is to set a breakpoint for that operation, another way would be to alter the representation of this instruction such that the operation could be recognized the next time it is executed.

At step 932 the execution of the Studied Application is resumed.

At step 933 the previously marked instruction is executed and recognized in a way that wakes up the Sampler Mechanism. In one embodiment, the execution is halted on this operation to allow for a Sample to be taken. Another embodiment would be to perform the sampling at this point without stopping the execution.

If step 930 determines that there is not R or more operations of the designated type remaining in the current basic block, 940 is the next step, as shown by the "no" leg of 930.

At step 940 the number of remaining operations of the designated type is reduced by the number operations of that type that remain in the basic block.

At step 950 the last operation of the current basic block is marked in a certain way. One way to do this is to set a breakpoint for that operation, another way would be to alter the representation of this instruction such that the operation could be recognized the next time it is executed At step 960 the execution of the Studied Application is resumed.

At step 970 the previously marked instruction is executed and recognized in a way that they wake up the Sampler.

At step 980 the next operation to be performed following the last operation of current basic block is determined. This may be done by interpreting the execution of this operation. Another embodiment would access this information directly from hardware, such as reading the "next program counter" register or some similar information. Yet another possibility include single-stepping this very instruction and then determining the address of the next instruction. Further options include disassembling the branch instruction and determining the outcome of the branch based on register and/or stack content.

At step 990 the current basic block is set to the basic block containing the next operation determined by step 980, after which step 920 is performed again.

Sampling Memory Objects of Different Sizes

Figure 3:
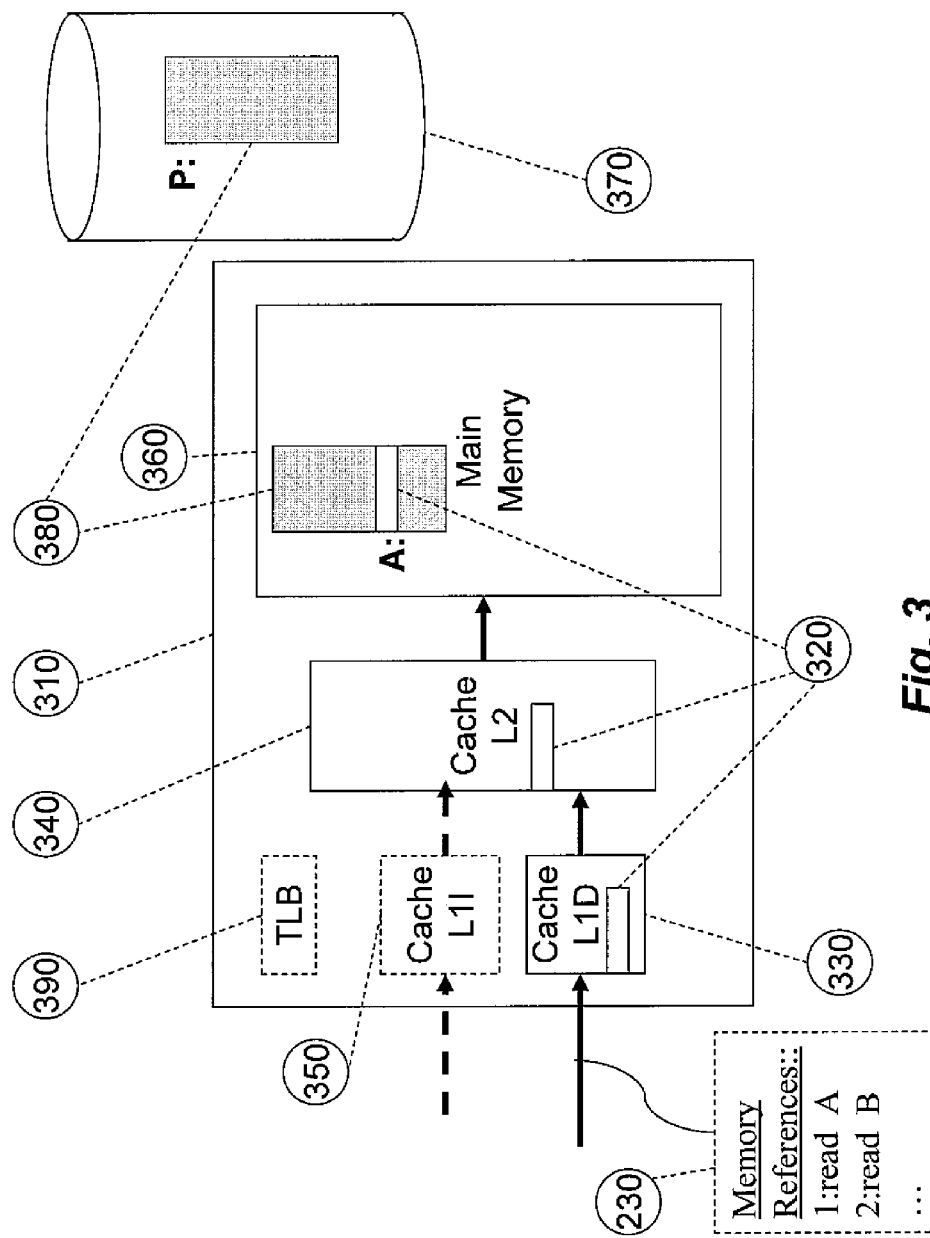
FIG. 3 is a block diagram of a prior art memory system including main and cache memories.

Some memory system models require that samples corresponding to Memory Object of several different sizes be sampled simultaneously. In some configurations one sample may require the trap mechanisms to be enabled in such a way that several Memory Object sizes are monitored. This could, for example, be required for modeling a memory system as shown in FIG. 3, if different block sizes are used, e.g., if the block size of the first level data cache 330 is 16 bytes and the block size of the second level cache 340 is 64 bytes. There are also for example situations where the explicit data object size corresponding to the size of the data read or written by the sampled memory operation should or needs to be monitored, such as monitoring accesses to one word in memory. This necessitates that ACD be collected for Memory Objects corresponding to both sizes on the Host Computer System.

One efficient way to collect ACD for Memory Objects of different sizes is to first set up the Sampler Mechanism to monitor the reuse for the largest object size, in the case of the present illustrative example, 64 bytes. Once the next reuse to this larger object has been detected it is determined if this to the largest object also accessed the smaller object (i.e., the 16 byte object). If so, the reuse of the smaller Memory Object is identical to the reuse of the larger object. If not, the sampling mechanism is configured to determine the reuse from this point in time to the next time the next smaller Memory Object is touched and calculate its reuse distance as the sum of this distance and the reuse distance of the larger object. There are several advantages to this approach over the technique of setting up a Watch Point for each memory object size. This approach only requires one active Watch Point for each sample regardless of the number of different Memory Object sizes. Furthermore, the spatial locality often present in the access pattern of a Studied Application will cause the trap generated by a large Memory Object to often also detect reuse for several of the smaller Memory Object sizes.

Figure 10:
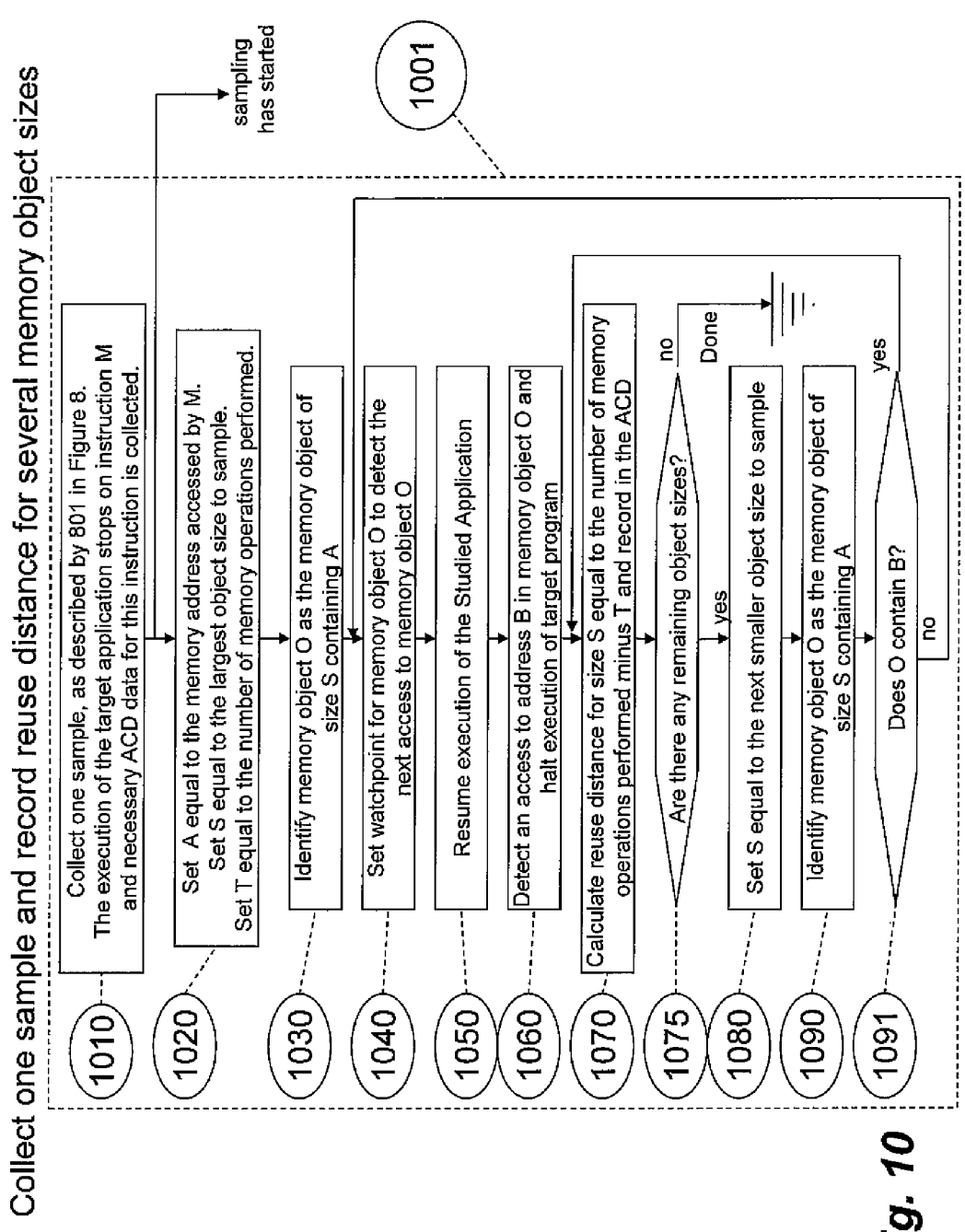
FIG. 10 is a flow chart of a method for simultaneously detecting reuse distances for Memory Objects of different sizes.

FIG. 10 is a flowchart for an efficient method of monitoring Memory Object of several sizes.

As step 1010 the appropriate sample is selected and necessary ACD data, such as the address of the instruction address of the sample, the address being accessed by it and a timestamp of when the sample occurred, is recorded. It should be noted that once this step has completed the collection of ACD data for this sample has been started. Meanwhile new sampling activities for other Samples may be started in parallel with the remaining steps for this Sample, marked as sampling has started in FIG. 10. It should be noted that the exact point in time (or other suitable demarcation) after which other sampling activities may be started vary between different implementations. For example, the arrow corresponding to a start of sampling may originate right after box 1050.

As step 1020 the accessed address A of the accessed Memory Object and the number of memory operations performed (T) is recorded. In one possible embodiment this information is retrieved by reading special hardware counters and registers. Furthermore, the largest Memory Object size to be sampled is recorded as S.

At step 1030 a Memory Object of size S containing the address A is selected. One implementation applies the same division of the memory address space into Memory Objects as is used by the memory system to model such as hashing on some specific address bits, but other ways of defining Memory Object boundaries may also be implemented At step 1040 the Memory Object selected is marked in a certain way. One way to do this is to set a Watch Point for a Memory Object of the selected address and size, another way would be to alter the representation of the data such that the an access to it could be recognized.

At step 1050 the execution of the Studied Application is resumed.

At step 1060 the previously marked Memory Object is accessed by an access to address B, which is recognized in a way that wakes up the Sampler Mechanism. In one embodiment, the execution is halted on this operation to allow for a ACD data to be recorded by the Sampler Mechanism. Another embodiment would be to collect this data at this point without stopping the execution.

At step 1070 the reuse distance of this sample for the studied Memory Object size S is recorded. One way of doing this is to determine the current number of memory operations performed and to subtract the recorded value T. At this step necessary ACD data, such as I2 address, D2 address, the reuse distance, etc, may be recorded, At step 1075 it is determined if ACD data for all studied Memory Object sizes have been recorded for this Sample. If so, the activity for this sample is terminated as shown by the "no" leg of 1075, else we turn to step 1080 as shown by the "yes" leg of 1075.

At step 1080 the next largest Memory Object size is set to S.

At step 1090, a Memory Object O of size S containing the address A is selected similarly to step 1030.

At step 1091 it is determined if the new Memory Object O contains the address B, if so we turn to step 1070 to record the reuse distance for this Sample as shown by the "yes" leg, else we turn to step 1040 as shown by the "no" leg to set up a Watch Point for Memory Object O with size S.

Automatic Adjustment of Sample Rate

Figure 11:
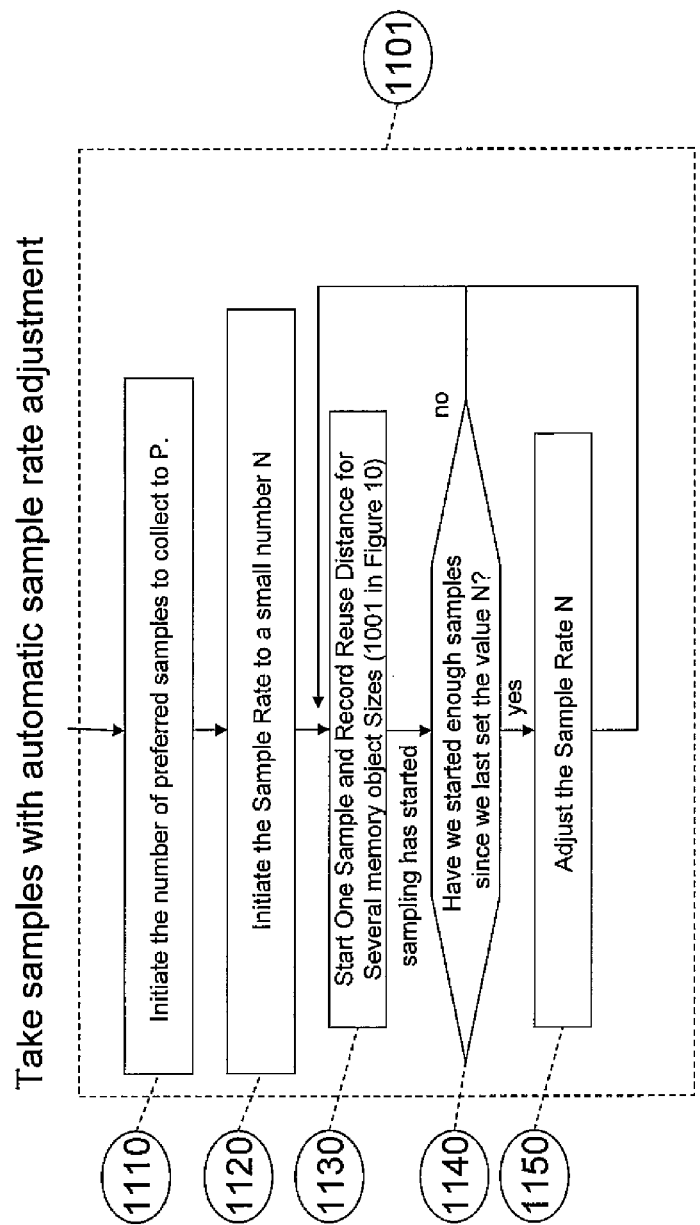
FIG. 11 is a flow chart of a method collecting many samples and automatically adjusting the sample rate of the method.

Short-running programs typically require a lower sample rate (i.e., will need to sample more often) that long-running applications. A sample method which dynamically adjusts the sample-rate would be beneficial. For example, the sample rate can be adjusted such that samples are taken less often (i.e., less frequently) for long-running applications. One embodiment of such a method is described with reference to the flowchart of FIG. 11.

At step 1110 the preferred number of samples P to be collect during the execution is determined. This may be done by predefining the value of P or by making the value of P configurable. In one embodiment the value of P predefined to 20.000.

At step 1120, the initial Sample Rate N is determined. This may be done by predefining the value of N or by making the value of N configurable. In one embodiment the value of N could be set to 100.000 resulting in one sample taken on average for every 100.000 Memory Access.

At step 1130 we start taking one Sample and record necessary ACD data. One way of doing this is according to the steps defined for 1001 in FIG. 10.

At step 1140 it is determined if we have taken a specified fraction of the preferred amount of samples using the current Sample Rate already. In one embodiment we could determine if at least half the preferred number of samples has been taken using the current Sample Rate. If so, we turn to step 1150 to adjust the Sample Rate, if not we turn to step 1130 as shown by the yes leg of 1140 to start to take yet another sample, else the "no" leg of 1140 will lead to step 1150.

At step 1150 the Sample Rate is adjusted. In one embodiment the rate N will be doubled to cause samples to be taken half as often on average.

Figure 19:
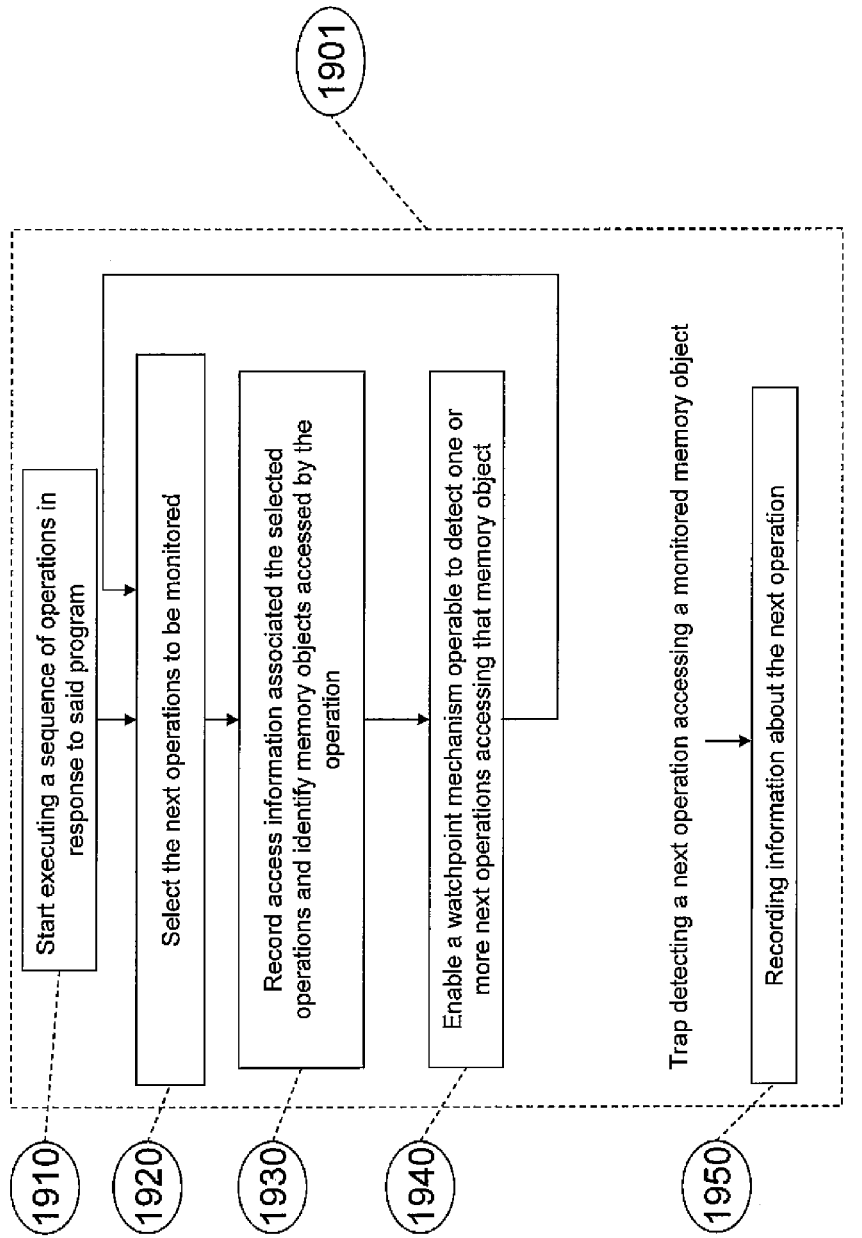
FIG. 19 is a flow chart of a method gathering memory usage information for a program of instructions.

Turning now to FIG. 19, describing steps for gathering memory usage information for a program of instructions. As a first step 1910, the execution of the program from which the memory usage information should be gathered is started. This will cause a sequence of operations, such as CPU instructions, database accesses, accesses to disk, or any other operations, to be initiated.

As a next step 1920, an operation to be monitored is chosen. This may be done according to a random selection scheme (e.g., uniformly distribution selection), or as a more biased selection (e.g., the next time an operation of a specific type, from a specific function is executed or an operation touching memory objects from a specific address range), or any other selection scheme.

Step 1930 may record specific information associated with the selected operation, such as the address of the memory objects it is accessing, instruction type of the selected operation. Another kind of information than may be recorded is call stack information. Call stack information identifies the history of functions, procedures, methods, tasks and similar program constructs used as a conduit to reach the operation. In one embodiment, the call stack information consists of the sequence of return addresses present in the activation records on the stack. In another embodiment, the call stack information contains the addresses of function entry points. In yet another embodiment, the call stack is augmented with function call parameter values. The call stack may be complete and leading up to the program's or thread's initial entry point, or it may be truncated so that only a few levels of call stack below the top frame are included. At this step the identity of an of memory objects accessed by the operator is identified.

At step 1940 some kind of trap mechanism is enabled. The trap mechanism will detect the next time an operation accesses the identified memory object.

Step 1950 is triggered the next time an operation accesses the identified memory object. That operation is sometimes referred to as the next operation. During this step, specific information about this operation is recorded, for example the address of the memory objects it is accessing, instruction type of the selected operation. Another kind of information than may be recorded is call stack information.

Modeling a Memory System

FIG. 3 shows an example of a conventional Memory System 310 including separate first level (L1) caches for data (330) and instructions (350), a unified second level (L2) cache storing both instructions and data (340) and main memory (360). Also shown is the mass storage or persistent memory here represented by a disk system (370) and the Translation Lookaside Buffer (TLB) (390) which caches address translations from virtual to physical memory and quickly can determine the physical location in main memory which has been allocated to store a page P. Note that the system described here is just an example of one embodiment of a system according to the invention for purposes of illustration and explanation. An ample number of alternative combinations of different topology and cache types exists.

Modeling of such a system may be performed using ACD or Sparse ACD collected on a Host Computer System running the Studied Application even though the Memory System to model may be very different from the memory system of the Host Computer System where the ACD 230 was collected. The goal is to estimate the behavior of the Model System 310 as if it was executing the Stream of Memory Access 230 of the Host Computer System. One functionality of such a system includes the following: Each time a new access from the Stream of Memory Access 230 attempts to access a specific Memory Object from the memory system, the contents of the caches in the hierarchy are first searched for that Memory Object. First the smallest and fastest cache at the L1 level is searched, secondly, the second level of caches are searched and so forth. Only if the data cannot be found at any level of caches will the slow main memory need to be accessed.

Modeling the memory system involves algorithms for determining if the Memory Object where the instruction being executed resides, and in case of a Memory Access also determining if the Memory Object accessed by the instruction can be found in a cache, and if so, in which level of cache they can be found. The algorithms and techniques described in this disclosure according to various embodiments of the invention are not limited to caches of memory system, but can also be applied to any other systems implementing similar kinds of caching systems including, but not limited to, disk caching, web caching and the caching performed by the virtual memory system.

Cache Algorithms

In one method of modeling a Memory System, such as 310, the model chosen for each level of cache in the memory hierarchy should closely correspond to the kind of cache at that level. Most importantly, the size of the modeled cache must be appropriate. Further, caches can be classified according to the size of Memory Objects handled by the cache, called its block size (sometime referred to a cache line size); in how many optional places a specific Memory Object can be placed, called its associativity; and, its strategy for picking a victim among the optional places where a new Memory Object can be placed, for example random replacement (RAND), round-robin(RR), least recently used (LRU), pseudo LRU (PLRU) and not most recently used (NMRU) algorithms.

Another method of modeling a Memory System, such as 310, the model chosen would instead model an idealized system. Here, the purpose of the modeling is to study some specific property of the studied application. Examples of such systems include but are not limited to systems with infinitely large caches, with fully associative caches or with cache where the Memory Object size is equal to the data size accessed by each Memory Access.

Modeling a Fully Associative Cache

Figure 4:
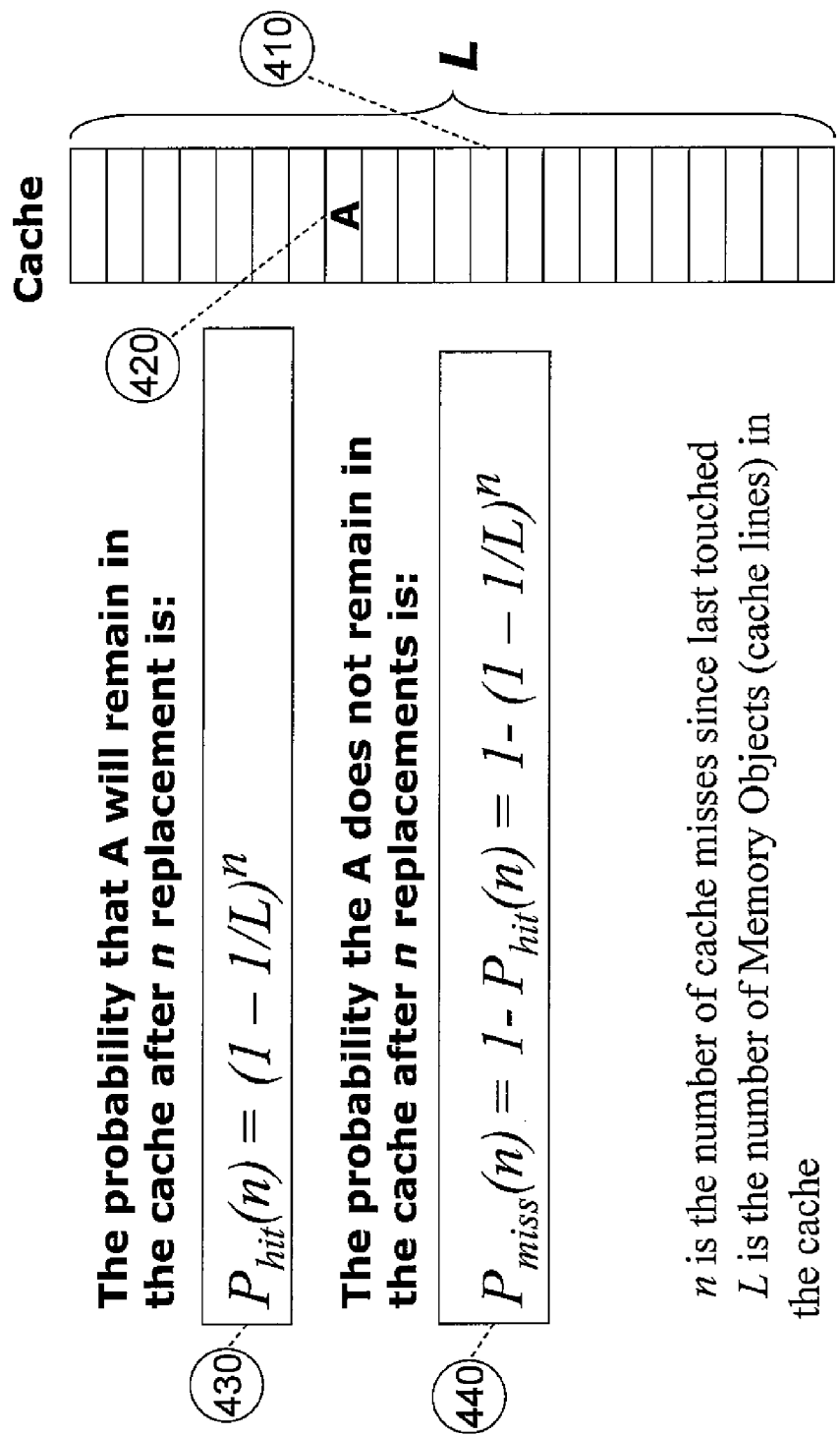
FIG. 4 is a diagram of a fully associative cache illustrating how a random replacement may be model.

A fully associative cache 410 is shown in FIG. 4. A fully associative cache has the property that a specific Memory Object may be stored in any of its L location dedicated for storing Memory Objects. The Memory Object A (420) is depicted as placed in one such places. Assuming that Memory Object always gets installed in the cache in the case of a cache miss, we can conclude that the Memory Object A would reside in the cache with the probability 1.0 right after it has been touched. Further, assuming a random replacement (RAND) the probability that A resides in the cache after one cache replacement has occurred is (1-1/L). Subsequently, if n Replacements have occurred since A was last touched the likelihood of finding A in the cache can be calculated by the function P_hit 430 in FIG. 4, and the probability of not finding A in the cache can be calculated by function P_miss 440.

Figure 12:
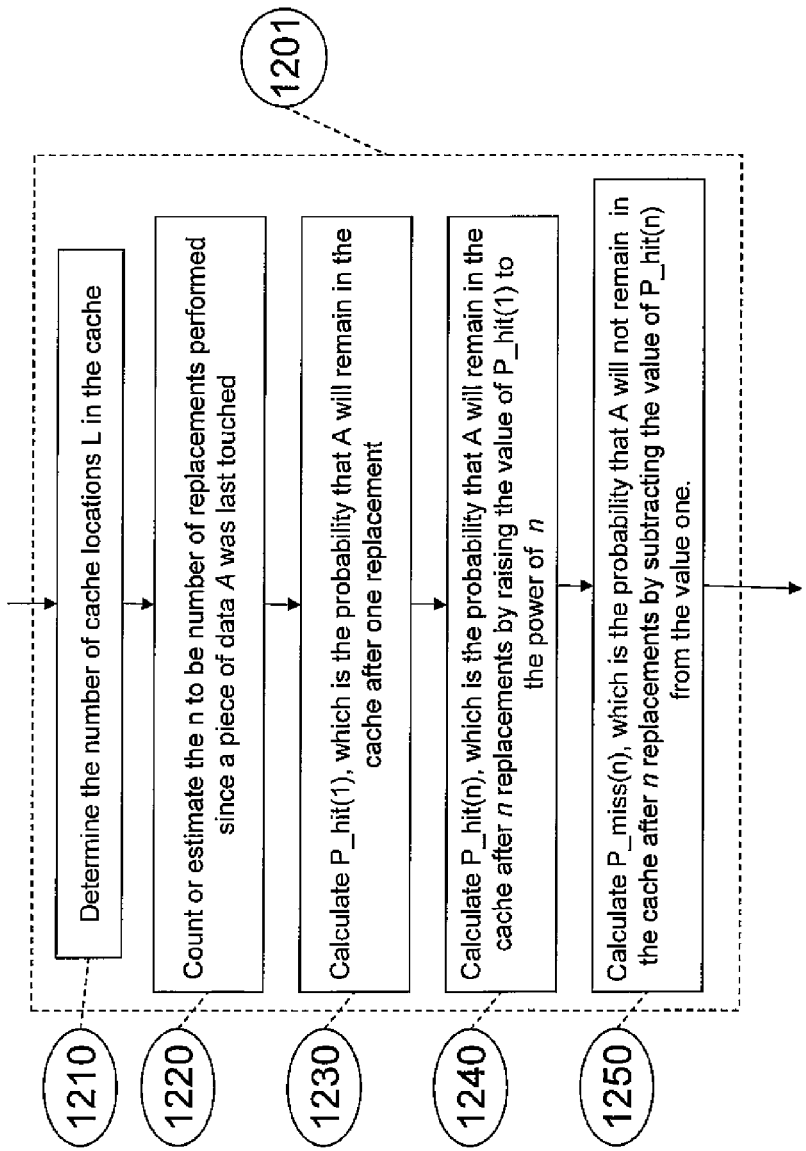
FIG. 12 is a flow chart of a method estimating miss probability for a specific memory object based on the notion of how many replacements have occurred since this memory object was last touched.

FIG. 12 shows a flow chart of a sequence of steps to determine the probability of a miss in a cache.

At step 1210 the number of locations L of the cache is determined. One way to determine this is to divide the cache size with the block size of this cache corresponding to the Memory Object size.

At step 1220 the number of replacements performed since a specific Memory Object A was last touched is determined. This may be done through counting of such events or by estimating the number of such events. In one embodiment, the number of replacements can be estimated by multiplying the assumed miss rate R with the reuse distance of the studied Memory Object A.

At step 1230 the probability P_hit(1), which is the probability that a given Memory Object resides in the cache after exactly one replacement, is calculated. In one embodiment, this is done using the formula, i.e., the value one subtracted by the result of a division between the value one and L At step 1240 the probability P_hit(n), which is the probability that a given Memory Object resides in the cache after n replacement, is calculated. In one embodiment, this is done using the formula, where n is the estimated number of replacement performed.

At step 1250 the probability P_miss(1), which is the probability that a given Memory Object will not resides in the cache after n replacement, is calculated. In one embodiment, this is done using the formula, where n is the estimated number of replacements performed.

Figure 5:
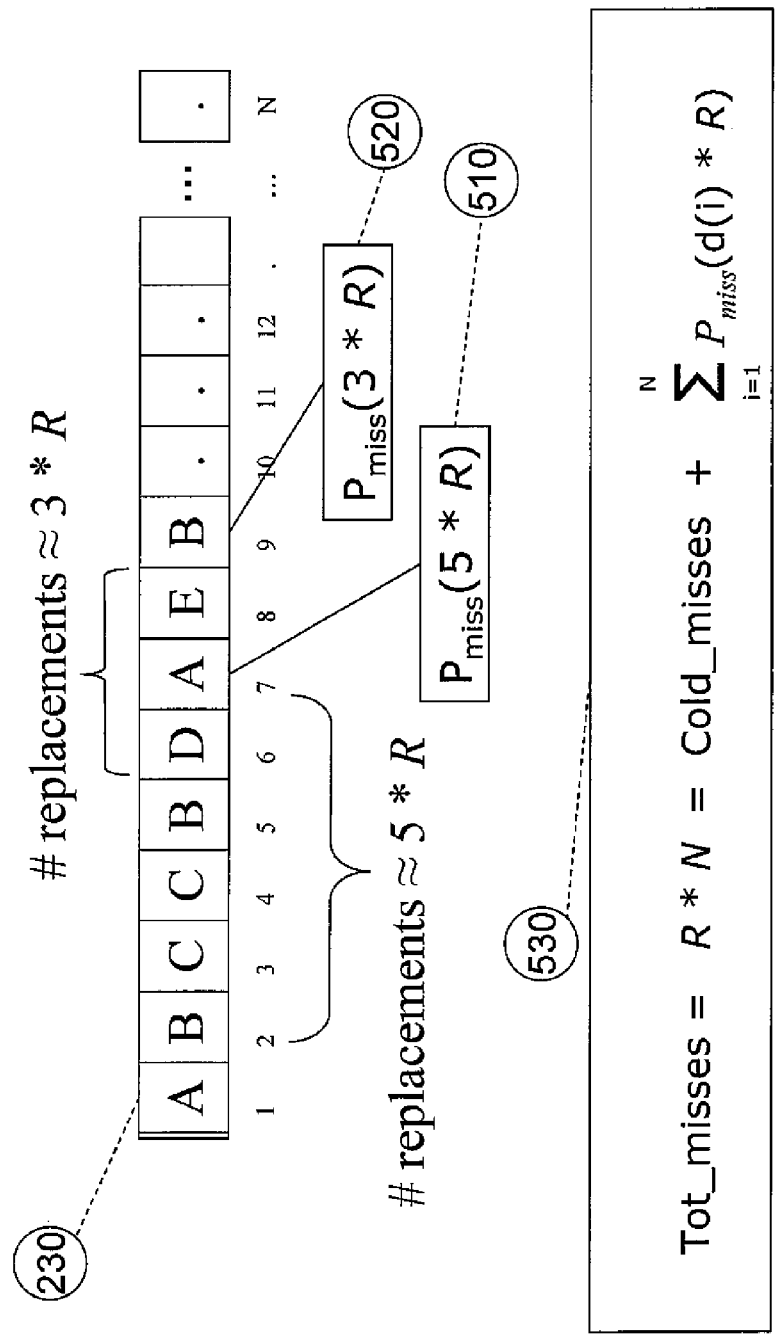
FIG. 5 is a diagram of a stream of Memory Accesses illustrating a method of estimating a miss probability for each access in a stream of Memory Accesses based on a reuse distance and an equation from which the miss rate of the application may be solved.

Turning now to FIG. 5, the memory instructions from the memory stream 230 can be found in the sequence at the top. If we assume that the miss rate is R, i.e., the likelihood that a memory instruction will not find its requested Memory Object in the cache is R, we can estimate the number of replacement that have occurred between the first and second access to the Memory Object to be its reuse distance multiplied by the assumed miss rate R. For the first sampled access of 230, 5R replacements are estimated to occur between the first and the second access to the Memory Object A and for the second selected sample 3R replacement will occur between the two accesses to the Memory Object B. Thus, the likelihood of a miss can be estimated by estimating P_miss by performing the steps described in FIG. 12. For the two examples in FIG. 5 such estimation is indicated by boxes 510 and 520. However, the P_miss equation only holds for misses caused by replacement activity, here called Capacity Misses. The likelihood of a cache miss is equal to 1.0 the first time a Memory Object with a size equal to the block size of the modeled cache is touched. One example of such a Cold Miss is Memory Access number 2 of 230, which is the first access to the Memory Object B.

Estimating Cold Misses and Working Set Size

Figure 13:
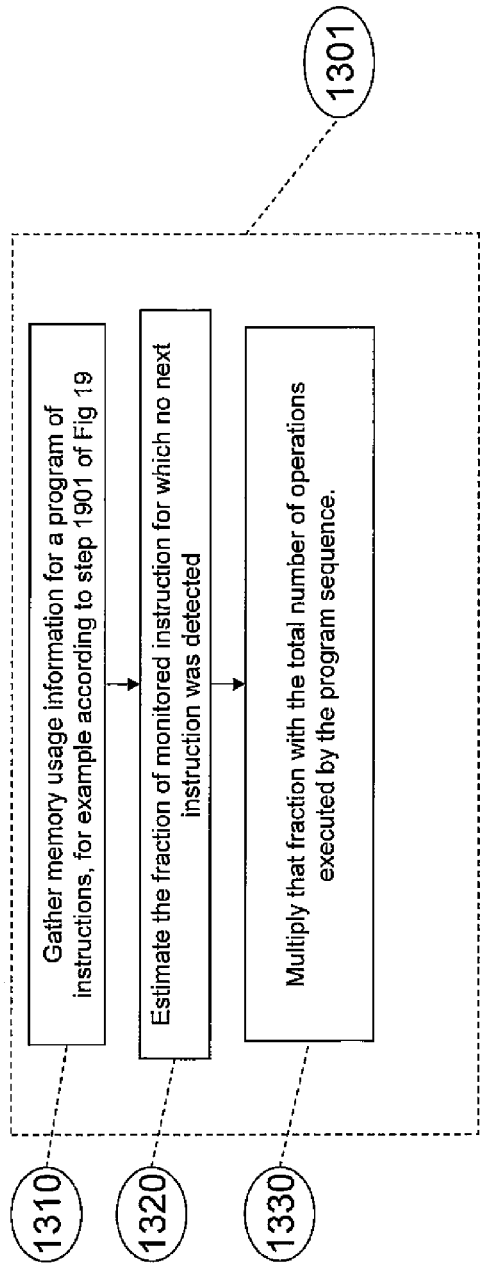
FIG. 13 is a flow chart of a method estimating the amount of memory objects used by a programs sequence including of a target application based on data from sparse samples.

The name Cold Misses is used to refer to cache misses that occur because the data is touched (e.g., accessed or addressed) for the first time. FIG. 13 is a flowchart of a method for estimating the amount of memory objects used by a program's sequence including, the cold miss rate and the working set for a fraction of execution of a Studied Application. The strategy outlined in FIG. 13 is to detect the last time a Memory Object is touched, rather that the first time it is touched. This is a novel way of estimating cold misses.

At step 1310 Application Characteristic Data is gathered including information about enabled trap mechanisms for which no reuse distance (i.e., no next operation) have been recorded. The Application Characteristics Data collected at this step may be sparse. In one embodiment, this is done by performing the steps 1101 of FIG. 11. In another embodiment, the number of samples for which no reuse distance has been recorded is estimated to be the number of dangling Watch Points of step 1070, which is the number of enabled trap mechanisms for which no next operation has been detected. Another alternative is to read previously recorded Application Characteristic Data including information about samples for which enabled watchpoint traps no reuse distance have been recorded. In one embodiment, only Characteristic Data associated with a Memory Object size equal to the block size B of a modeled cache are being considered. It is further possible that only a certain selection of Characteristic Data, such as for example data from one segment of the execution, data associated with certain Memory Objects or data associated with certain instructions are collected at this step.

At step 1320 it is determined how many of the initiated samples' trap mechanisms that still have not detected a next access to the corresponding Memory Object of the studied Memory Object size O. In other words, the fraction of enabled traps for which no next operations has been identified is measured. In one embodiment, this involves determining how many samples that have not recorded a reuse distance value for the selected Memory Object size according to step 1070 of FIG. 10.

At step 1330 the fraction number produced by step 320 is multiplied by the total number of operations executed by the program.

In one embodiment, the number of samples collected at step 1310 is from one segment of the execution of the Studied Application why the calculations performed in the following steps result in estimations of corresponding parameters for that segment only.

Estimating Capacity Misses

The total number of capacity misses caused by replacement as discussed in FIG. 12, can be calculated by a summation over the total number of Memory Accesses not experiencing cold misses.

The total number of cache misses may be calculated in two different ways: first, the total number of Memory Accesses N is multiplied by the estimated miss rate R, secondly the number of cold misses plus the miss probability of all Memory Objects touched at least a second time. The likelihood that a Memory Objects touched at least a second time will experience a miss may be estimated by using the P_miss steps of FIG. 12, using its distance d(i) multiplied with the estimated miss rate R as the number of replacements. This results in the equation for the total number of misses:

$$\text{Tot\_misses} = R \cdot N \quad \text{[Equation 530]}$$

$$= \text{Cold\_misses} + \sum_{i=1}^{N} \text{P\_miss}(d(i) * R)$$

Someone skilled in the art realizes that if the total number of Memory Accesses N, as well as the number of Cold misses K, as well as a reuse distance d(i) for the N Memory Accesses, we can solve the value of R from Equation 530 numerically. It should be noted that d(i) is defined as zero if no reuse distance has been recorded and that P_miss(0) is zero according to the definition of P_miss(n).

A rewritten version of the equation, as defined by Equation 540, only estimates P_miss for samples with a recorded reuse distance, and thus does not require a definition of d(i) if no reuse has been detected.

$$Tot_{misses} = R \cdot N = Cold_{misses} + \sum_{i=1}^{N-Cold_{misses}} P_{miss(d(i)*R)}$$

[Equation 540].

Equations 530 and 540 are both valid also for sparsely sampled ACD data where N is the number of samples and Cold_misses is the number of those samples which are estimated to be cold misses.

Each unique Memory Object used by an application will cause exactly one cold miss, why the Cold_miss variable in equations 530 and 540 may be replaced by Number_of Memory_Objects.

Using Histograms

Figure 6:
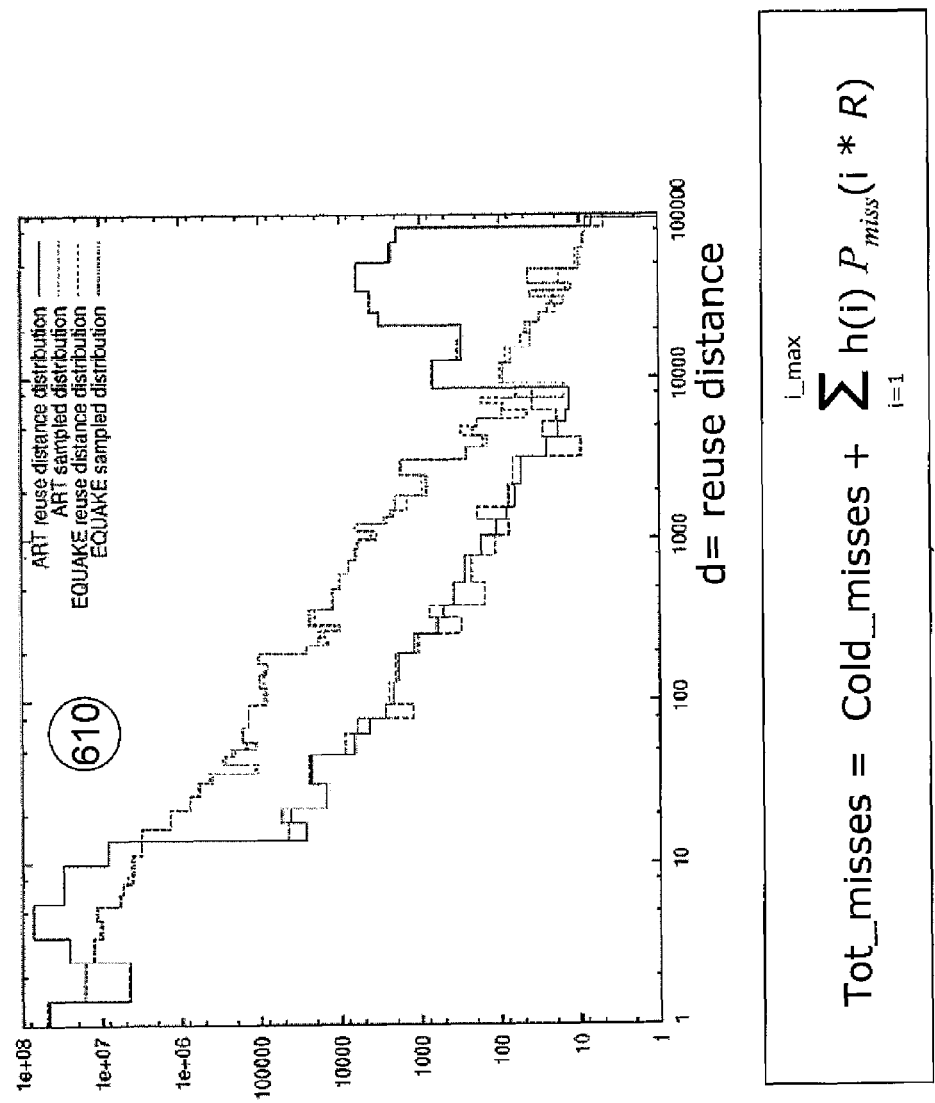
FIG. 6 is a reuse histogram for two applications based on data that may be captured using sparse information about the reuse distance of Memory Accesses.

Furthermore, if we only know the reuse distance d(i) for a small but representative subset M of the Memory Accesses, equation 530 still hold for those Mreferences and will result in a representative estimation of the R value. Here, the letter N is replaced with the letter M, Tot_misses is the estimated number of the M Memory Accesses that misses, the Cold misses is the estimated number of the M Memory Accesses that cause a cold miss and the summation goes from 1 to M. To further convince ourselves of this thesis, FIG. 6 shows the reuse histogram 610 for two Studied Applications. The value h (d) on the Y-axis for each X-value of d shows the number of Memory Accesses recorded with exactly that value. Each application shows the shape of their corresponding reuse histogram based on every access as well as based on the sparse sampling of every 10,000$^{th}$ access (but scaled up). Such a histogram is one way of presenting the reuse distance distribution for a program, or a segment of a program. If the sparse sampling is done in a random and completely independent way, it should come as no surprise that the sampled shape corresponds well with the shape based on every access. Multiplying each h(d) value for a histogram build from sparsely sampled ACD with its Sample Rate results in a new histogram equivalent with histogram based on non-sparse data.

Since equation 530 can be transformed to the equation 620 based on histogram data it can easily be understood that sparse sampling can be used for solving the value of R.

Estimating Cache Misses for a Random Replacement Cache

Figure 14:
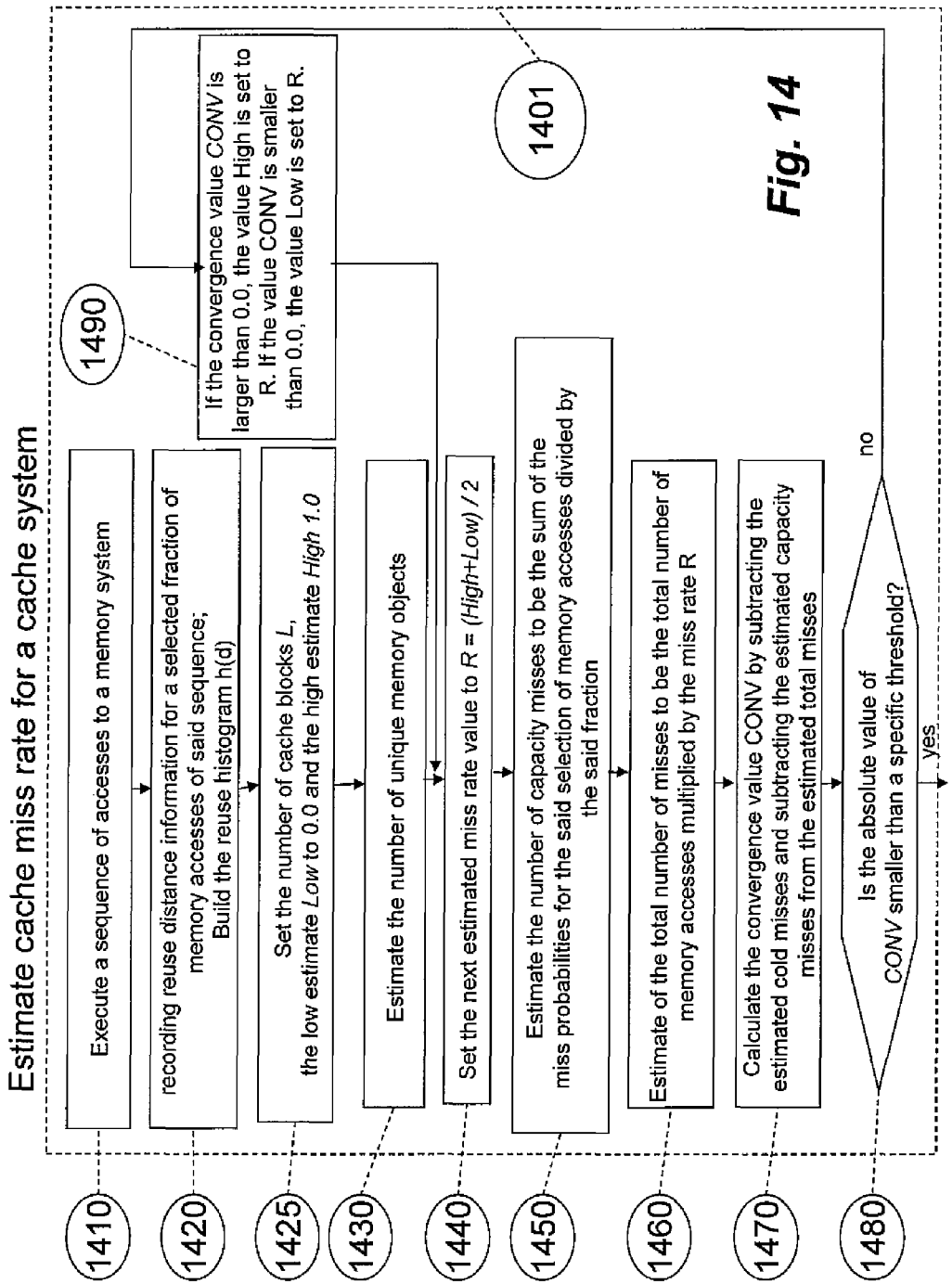
FIG. 14 is a flow chart of a method estimating miss rate for a fully associative cache with random replacement based on data from sparse sampling.

FIG. 14 is a flow chart of a sequence of steps for estimating the miss rate of a cache with respect to a sequence of accesses to a memory system.

Steps 1440 through 1490 are all one example of an iterative solver. Many alternative ways of alternative solvers exist and they are all possible embodiments for steps 1440 through 1490.

At step 1410 Application Characteristic Data is collected for example in a similar way to step 1310 of FIG. 13. This may be done by collecting reuse distance information for a selection of memory operations At step 1420 a histogram based on the Characteristic Data collected may be built. In one embodiment, reuse distance property of the Characteristic Data is being targeted to make the entry h(d) of the histogram represent the number of Samples in the Characteristic Data that has a reuse distance equal to the value d. One may build a more coarse histograms where each entry h(d) represents the number of Samples for a range of reuse distances.

At step 1425 certain parameters of the target cache and values for the iterative solver are initiated. In one embodiment the number of locations L of the modeled cache is estimated by dividing the cache size S with the block size B. Possible iteration values initiated are a high guess value High, set to 1.0 and a low guess value Low, set to 0.0.

At step 1430 the number of cold misses is estimated. One way of doing this is to use the steps described in FIG. 13. In one embodiment, only Cold misses associated with the selected data of step 1410 are considered. Since the number of cold misses is equal to the number of unique Memory Objects, of the same size as the Objects in the cache, accessed by the sequence of accesses, the number of unique Memory Objects may be used instead of the number of cold misses.

At step 1440 a value of the miss rate R is estimated. This may be done by calculating the average between the high guess High and the low guess Low values.

At step 1450 the number of capacity misses is estimated. This may be done by summing up each histogram value h(d) multiplied by the corresponding Miss Probability 1201, where the number of replacement n is of step 1240 is estimated to be the value d multiplied by R. In an alternative embodiment, the miss probability for Samples selected in 1410 may be estimated individually and then summed together. The individual miss probability may be calculated using the Miss Probability steps in 1201 of FIG. 12, where the number of replacement n is of step 1240 is estimated to be the reuse distance d of the Sample multiplied by R.

At step 1460 the total number of misses caused by the samples selected in 1410 is estimated. This may be done by multiplying the number of samples selected with the estimated value of R.

At step 1470 a convergence value CONV is calculated. This may be done by setting the value CONV to the result of subtracting the estimated cold misses and subtracting the estimated capacity misses from the estimated total misses.

At step 1480 a convergence test is performed. In one embodiment, it is determined of the absolute value convergence value CONV is smaller than a threshold. If so, the estimated miss rate is R, if not we turn to step 1490.

At step 1490 new values for the estimate variables are estimated. In one embodiment, the value of the convergence test is assessed. If the convergence value CONV is larger than 0.0, the value High is set to R. If the convergence value CONV is smaller than 0.0, the value Low is set to R. Following step 1490, we turn again to step 1440 to perform a new estimation of the miss rate R.

Modeling an LRU Cache

A cache based on least recently used (LRU) replacement algorithm will require a different method for estimating its miss rate. Knowing the so-called stack distance for each Memory Accesses would here be a good help. While reuse distance is the total number of Memory Accesses between the two accesses to the same Memory Object, stack distance is the number of Memory Accesses to unique Memory Objects. If the stack distance is smaller than the number of Memory Objects that the cache can hold, called L for the cache 410 in FIG. 4, the second access to a Memory Object will result in a cache hit, or else a cache miss has been estimated.

In order to make use of the reuse distance data collected to also model LRU caches, a new method for conversion between reuse distance and stack distance is needed.

Figure 7:
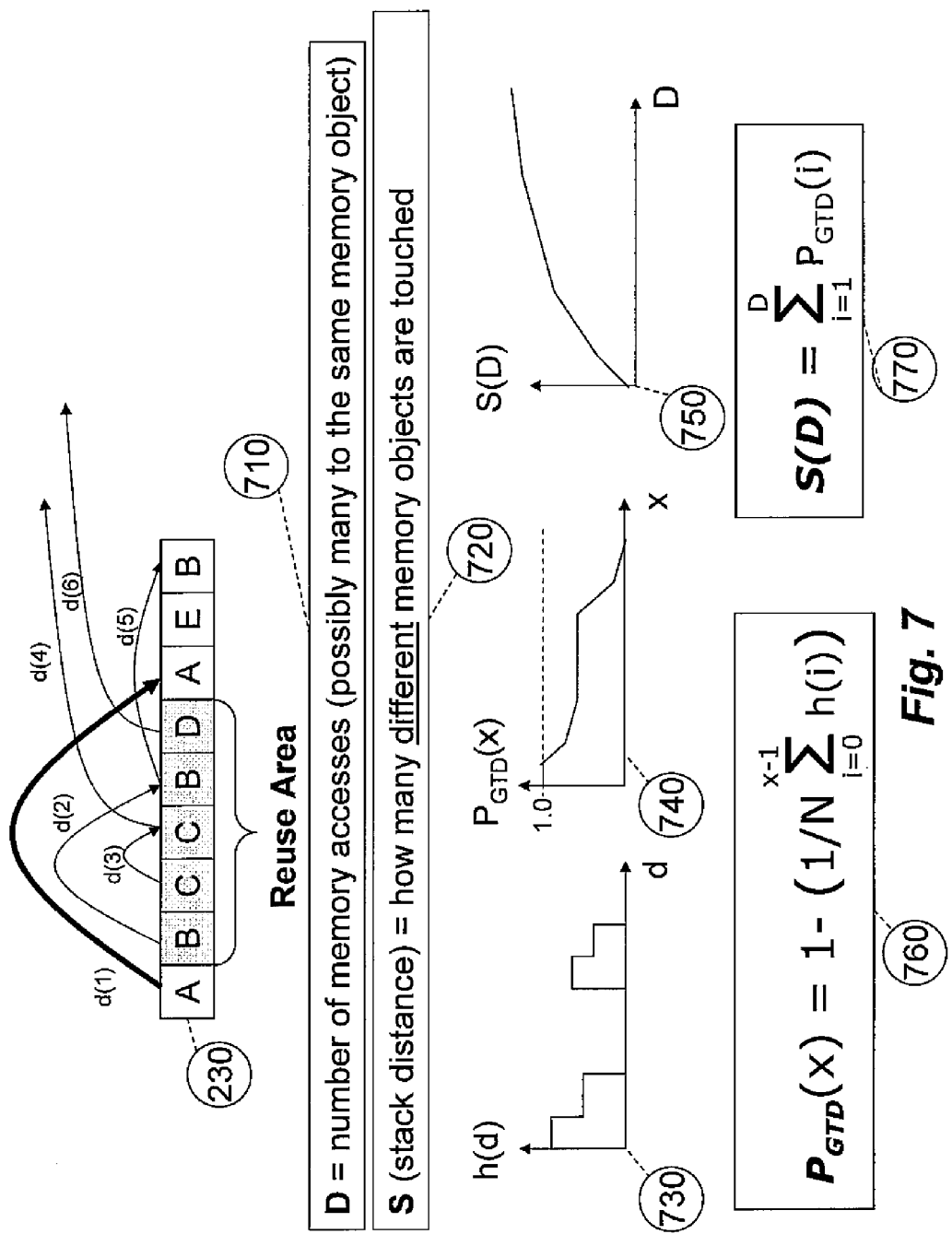
FIG. 7 is a diagram of a stream of Memory Accesses illustrating how the shape of a reuse histogram can be used to estimate a method for calculating the application's stack distance.

Turning now to FIG. 7, the sequence of Memory Accesses 230 have been augmented with the reuse distance arrows for each the first six Memory Accesses, named d(1) through d(6). By studying the different Memory Object accessed during the Reuse Area of A, defined as the Memory Accesses between the first and the second access to A, we can determine that the corresponding stack distance for this access is 3, since only the objects B, C and D are touched during this time period. Another way to draw this conclusion is to look at the reuse distance arrows for d(2) through d(6), and determine how many of these point beyond the Reuse Area. In this example d(4), d(5) and d(6) all point beyond the second access to A, this tells us that the stack between the two references to A is 3. This way of estimating the stack distance can be generalized for a Studied Application with a reuse histogram h(d). Starting with a histogram 730 in FIG. 7, we can calculate the function 740 $P_{GTD}(X)$, showing the probability that a Memory Access of the application has a reuse distance which is larger than a certain value x, based on the summation of the reuse histogram values from i=0 to i=x−1 as shown by the formula 760. Determining the average stack distance S(D) 750 can now easily be done for a given value of D by summing up the probability that each of the D Memory Accesses in the Reuse Area is pointing beyond the Reuse Area, as shown by formula 770. We can now calculate the miss probability for each memory access i by determining if its stack distance S(d(i)) is larger or smaller than L. In one embodiment the reuse histogram of a Studied Application, which easily can be estimated by sparse sampling as shown in FIG. 6, can be used as input to estimate the stack distance S(d(i)) using the above method.

Estimating Stack Distance

Figure 15:
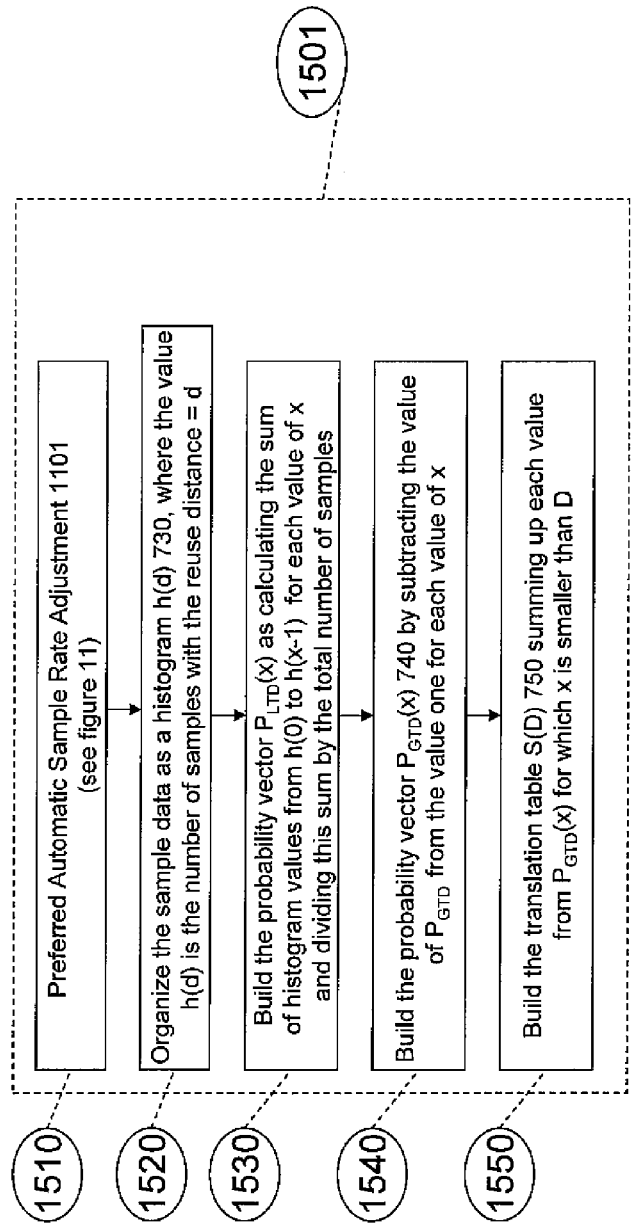
FIG. 15 is a flow chart of a method building a translation table to convert reuse distance data into stack distance data.

FIG. 15 shows a flow chart of how to build a translation mechanism translating reuse distance to stack distance, this implies that for a given sequence of memory operations consisting of some number of memory operations FIG. 15 describes one method of estimating the number of unique memory objects touched during that segment.

At step 1510 Characteristic Data is collected similarly to step 1310 of FIG. 13. In one embodiment, this collection could be done by performing step 1101 of FIG. 11. Another way may be to read already saved ACD data from memory or from a file.

At step 1520 a histogram is built similar to step 1420 of FIG. 14.

At step 1530 the probability vector is $P_{LTD}$ (probability that a sample has a reuse distance smaller than d). In one embodiment, this may be done by summing up all histogram values between h(0) and h(d−1) and dividing the result by the total number samples.

At step 1530 the probability vector is $P_{GTD}$ (probability that a sample has a reuse distance greater than d). In one embodiment, this may be done by subtracting the corresponding value $G_{LTD}$ from the value 1.0.

At step 1550 the actual translation table S(D) is put together. Each entry of S(D) is calculated by summing up all values between and including $P_{GTD}$ (1) to $P_{GTD}$(D).

Given the translation table S(D), the stack distance for each Sample i can be estimated by performing a lookup SD using its distance rd(i): Stack_distance(i)=S(rd(i)). Let L total number of Memory Objects in the modeled cache. Then, an estimated stack distance smaller than L result in a hit estimate with the estimated probability of 1.0, while a stack distance larger than L result in a miss estimate for the Sample. This yields the equation for the total number of misses in an fully associative LRU cache:

$$Tot_{misses} = Cold_{misses} + \sum_{i=1}^{N} (\text{if}(s(\text{rd}(i)) < L)\text{then } 1 \text{ else } 0)$$

where N is the number of selected Samples from ACD to use as input.

Figure 20:
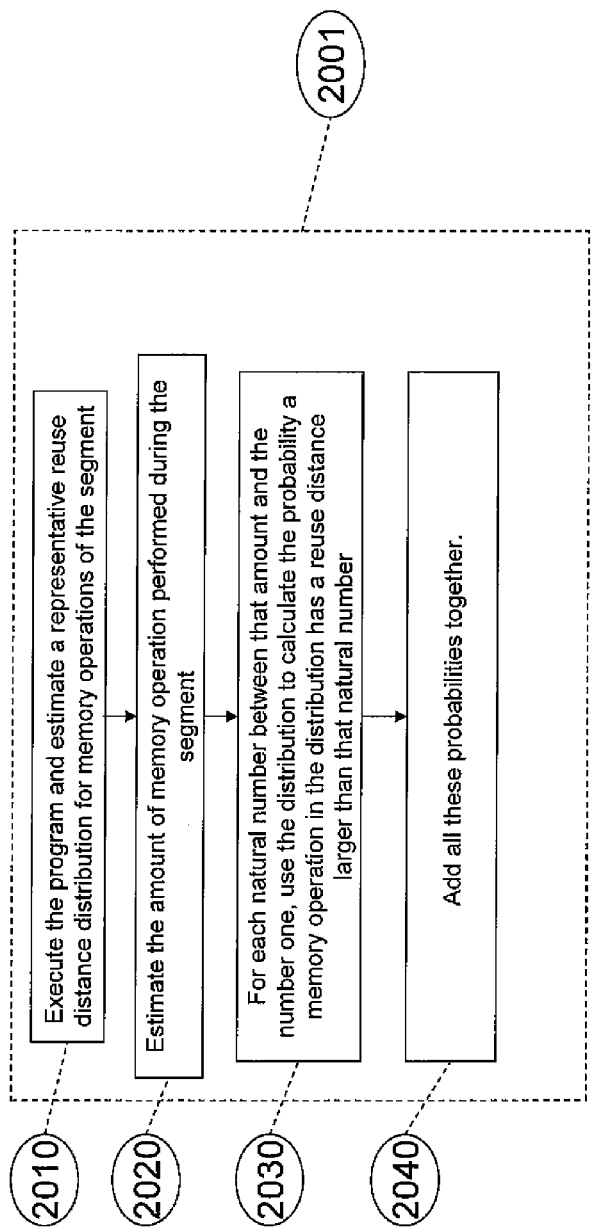
FIG. 20 is a flow chart of a method estimating the number of unique memory objects in a segment of a program.

Turning now to FIG. 20, estimating the number of unique memory objects in a segment of a program of instructions. At step 2010, a representative reuse distance distribution for memory operations of the segment is collected. One way to do this is to create a histogram over the reuse distance recorded for all operations of the segment, or to estimate a histogram based on a selection of operations of the segment. A histogram may also be collected based on operations close to the segment or based on the operations of the entire program, if that will produce a representative distribution.

At step 2020, the number of memory operations performed during the segment is estimated to be D. This corresponds to the reuse distance of the segment.

At step 2030 the natural number series from one up to D defined in step 2030 is examined and for each such number, a probability fraction is calculated as the amount of objects with a larger reuse distance than that number in the histogram is divided by the total number of objects in the histogram.

As step 2040, the probabilities estimated in step 2030 are added together.

In summary, steps 2030 and step 2040 can be summarized by the equation:

$$\text{number\_of\_unique\_memory\_objects} = \sum_{i=1}^{D} P(\text{reuse\_dist} \geq i)$$

A More Accurate LRU Model

While the stack distance estimation described above will result in a good estimate for large reuse distance values, shorter reuse distances would need to include more detailed information or knowledge about the relationship between reuse distance and stack distance. Especially, the histogram bin that corresponds to the reuse distance minus one will require more attention. That particular reuse distance would correspond to a distance that coincides with the trigger instruction for the reuse distance under consideration. Since we know that none of the memory operation in the Reuse Area of FIG. 7 can have their reuse distance d(x) pointing to the second occurrence of A, this has to be reflected in the Equation.

Consider an example where the reuse distance between two Memory Accesses to A is zero. Clearly, there can be no other accesses between the two Memory Accesses to A and the stack distance should be defined to be 0. This yields that S(0)=0 Now, consider a situation with a reuse with distance of one, i.e., between the two consecutive Memory Accesses to A is one access to a different memory object X (i.e., {A, X, A}). Despite the acquired sample's reuse distance distribution, the access X cannot have reuse distance 0, since it would then collide with the trigger access corresponding to the second access to A. From this example, it is evident that in this scenario, X's reuse distance cannot be one, since it would then coincide with the second access to A. When we calculate the reuse distance probability, we therefore temporarily remove the contribution from samples with exactly this reuse distance. This yields that S(1)=1

Now consider a situation with a reuse with distance of two, i.e., there are two references X and Y within this interval (i.e., {A, X, Y, A}), and where the projected average stack distance is between one and two. Now, consider access X. The sample histogram offers some information on the distribution of its reuse distance. For instance, the probability that X's reuse distance equals zero is h(0)/N, where N is the total number of samples included in the histogram. Generally, the probability that the reuse distance is D is given by h(D)/N. However, if X's reuse distance is one, both X and Y must access the same memory object while the stack distance between the two references to A is one. For all other histogram values for X and Y are to different memory objects and the stack distance between the two references to A is two.

$$S(2) = 1 * h(0)/(N - h(1)) + 2 * (1 - h(0)/(N - h(1)))$$
$$= 1 + 1 - h(0)/(N - h(1))$$
$$= S(1) + 1 - h(0)/(N - h(1))$$

Continuing this reasoning gives the general recursive formula:

$$S(r) = S(r-1) + \sum_{k=0}^{r-2} h(k)/(N \; h(r-1)),$$

where $S(0) = 0$.

Adjusting for Variable Miss Rate

All System Modeling techniques discussed so far assume a uniform distribution of the memory instruction's properties. Example of such assumptions is the miss rate R of equations 530 and 620, as well as the property of the Reuse Area of FIG. 7. While the described methods will still be a fairly good approximation, adding adjustments for the variations can improve the results even further.

One way to overcome this is to split up the execution in many time windows and to apply each equation to one time window at a time. In one embodiment the reuse histogram of one time window is used to calculate the miss rate R for that time window. The miss rate of the entire application is then calculated based on the miss rate of each time window. One alternative to statically division into time windows is to have sliding time windows.

Compensating for Set Imbalance

Figure 16:
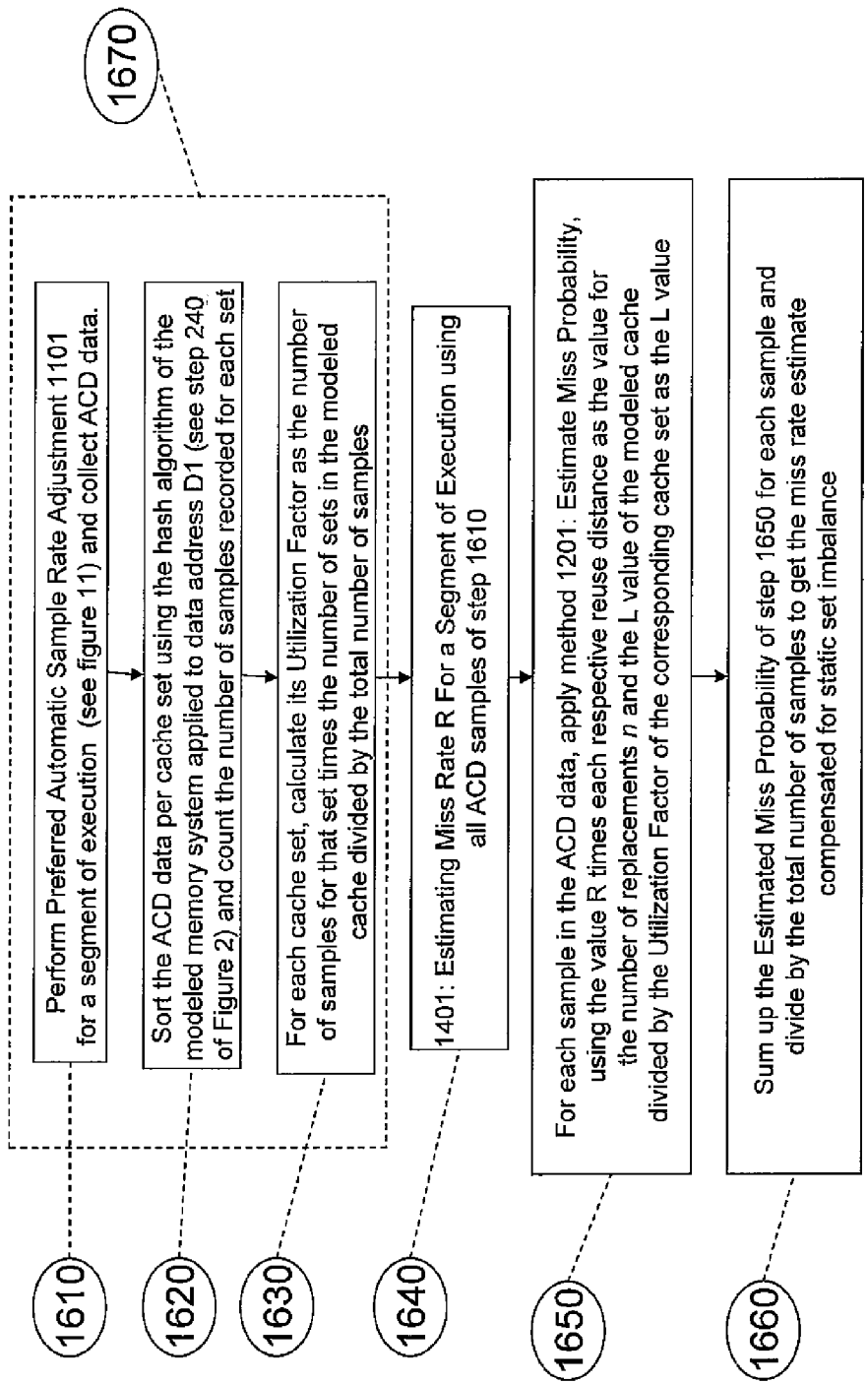
FIG. 16 is a flow chart of a method compensating the miss rate estimation on FIG. 14 for limited associativity cache implementations.

FIG. 16 shows a flow chart describing how to compensate for set imbalance for a cache with random replacement.

At step 1610 Application Characteristic Data is collected similarly to step 1310 of FIG. 13. In one embodiment, this collection could be done by performing step 1101 of FIG. 11. Another way may be to read already saved ACD data from memory or from a file or from a different computer for example using a network connection.

At step 1620, the samples collected in 1610 are sorted according to the set-hash function of the modeled cache, i.e., the function used to select one specific cache set as a function of the memory address accessed, and the number of samples per set is determined.

At step 630 the Utilization Factor is calculated for each set. The Utilization Factor is 1.0 for a set which received the average number of samples. A Utilization Factor higher then 1.0 indicate that the set is overused. The Utilization Factor for a set may be calculated by multiplying the number of samples targeted to the set with the number of sets of the modeled cache and then dividing the result by the total number of samples.

At step 1640 the miss rate without any consideration of set imbalance is calculated, for example using the method 1401 described in FIG. 14.

At step 1650 the samples of the ACD collected at step 1610 are used one by one to estimate their individual miss probability, for example using the method 1201 described in FIG. 12, using L of the modeled cache divided by the Utilization factor as the L value of method 1201.

At step 1660 the average of the miss probabilities of step 1650 is calculated.

Figure 17:
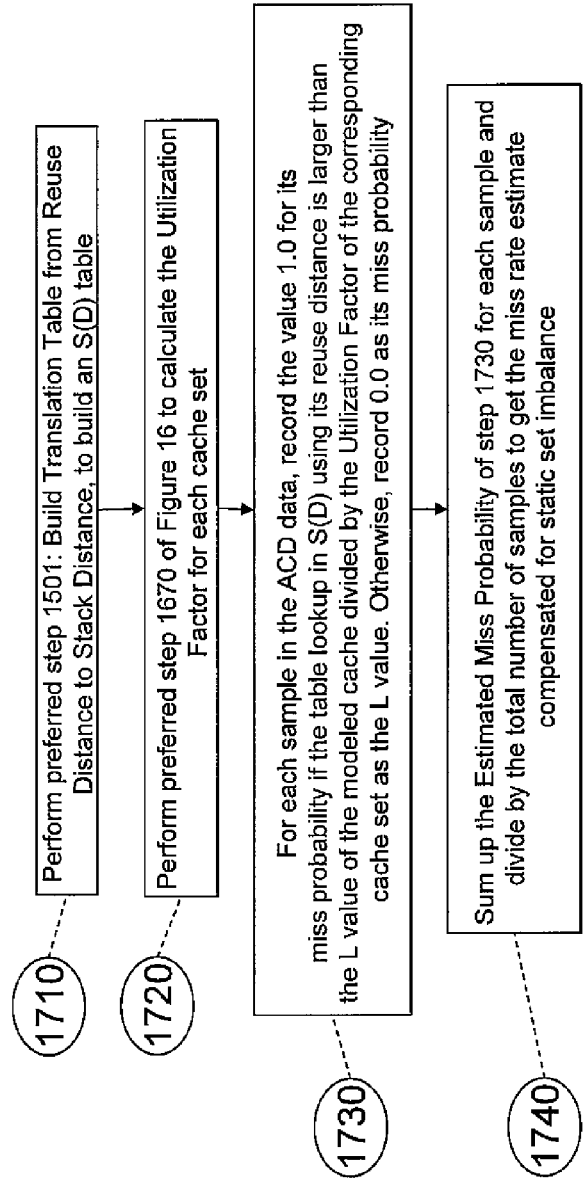
FIG. 17 is a flow chart of a method estimating miss rate for a LRU taking limited associativity into account.
Figure 18:
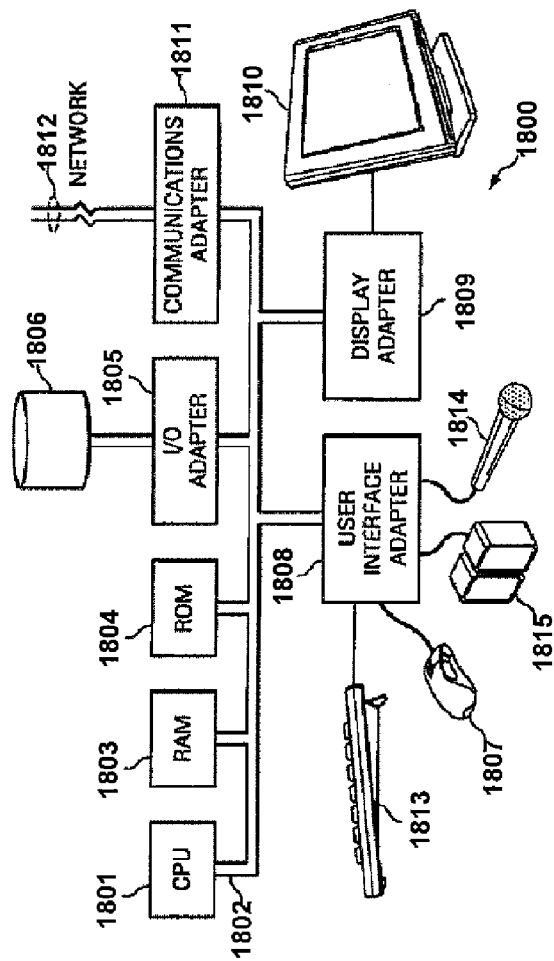
FIG. 18 is a block diagram of a computer system.

FIG. 17 describes a method to estimate the miss ratio of an LRU cache while taking set imbalance into consideration.

At step 1710 a translation table S(D), translating reuse distance ACD into stack distance values, is built. One way to do this is according to step 1501 of FIG. 15.

At step 1720 the Utilization Factor is determined for each set. In one embodiment, this is done in accordance with step 1670 of FIG. 16.

At step 1730 all the samples of the ACD samples collected at step 1710 is accessed one by one. If the lookup of the table S(D) using the reuse distance D of a sample results in a stack distance value is larger than the L value of the modeled cache divided by the Utilization Factor of the corresponding set, a miss probability of 1.0 is recorded for that set. Else, the miss probability of 0.0 is recorded.

At step 1740, the average miss probability estimated for each sample in step 1730 is calculated as an estimate of the average miss probability for the Studied Application.

Adjusting for Semi-Static Conflicts

All System Modeling techniques discussed so far are targeting caches organized as fully associative caches with the property that a Memory Object may be placed in any of their L locations. A more common organization for caches is the so-called set-associative organization, where each specific Memory Object can only be placed in the subset consisting of W locations of the L total locations in the cache. Such an organization is called W-way associative. Organizations ranging between 4-way and 16-way are common today. The collection of possible places where a Memory Object can be placed is called a Set. A part of the Memory Object's address is often used to determine which Set it belongs to. An N-way associative cache with L locations has L/W Sets, where W is the number of associative ways in each set of the cache. We denote the number of sets in a cache S.

N-way associative caches result in a higher miss rate that fully associative in practice for two reasons: Memory Objects accessed by a program are not uniformly distributed over the sets and the replacement algorithm, such as random or LRU, can only make their pick among W Memory Objects rather than L object.

We can measure the Set Ratio describing how the Sampled Memory Object are spread over the different Sets during the execution of the Studied Application. With an even distribution of Memory Accesses, each set should be accessed with the Set Ratio 1/S. The reference to a set with the ratio 2/S will effectively experience a cache with only L/2 location using the formulas. Adjusting the cache size in such a way on a per-sample basis in the above mentioned methods will effectively take some of the negative effects of set-associative caches into account. If the Set Ratio is measured and their effect adjusted for Samples from shorter time windows during the execution, even some semi-dynamic effect of cache conflicts will be taken into account.

Adjusting for Frequent Reuse Areas

For some Studied Applications one specific Reuse Area measuring the reuse between the same two instructions I1 and I2 may be common (Reuse Area contains all intervening accesses between instruction I1 and I2). If so, special measures can be taken to study this Reuse Area extra carefully. By collecting statistics about the other instructions and Memory Objects sampled during the different occurrences of the Reuse Area, it can be determined if conflicts in the caches of different levels are likely to occur with the reuse Memory Object of the Reuse Area. If one occurrence of the specific Reuse Area is measuring the reuse distance for a Memory Object with the address A and three new Samples accessing different Memory Objects are taken during this Reuse Area, one of which accesses a Memory Object hashing to the same Set as A, we record a 33% conflict rate for this occurrence of the Reuse Area. Combining such information with those of other occurrences of the same Reuse Area allows for the conflict rate for the Reuse Area to be calculated. Through this technique it can be determined that a Reuse Area recording a reuse distance smaller than L still would yield a cache miss due to cache conflict. This way, also dynamic conflicts can be calculated for frequent Reuse Areas.

The usefulness of this technique will increase if samples are collected in Batches, i.e., time periods during which Samples are collected more frequently. The time period between the Batches can be rather long though, depending on the Sample Rate.

Modeling Instruction Misses

Even though the methods described so far describe how to estimate the miss rates of memory caches, such as cache 330 of FIG. 3, someone skilled in the art can easily use the described methods to also estimate miss rates of instruction caches (350) or unified caches (340). The reuse distance for Instruction Objects can be measured using so-called trace-points on the instruction addresses of the Instruction Objects.

Modeling Multiple Cache Levels

FIG. 3 shows an example of a modern memory system consisting of several cache levels. Assuming full inclusion between the different cache levels, the above described methods may be used to model such a system. Full inclusion between cache levels implies that if a Memory Object or Instruction Object resides in the higher-level and larger caches, they should also reside in the corresponding lower-level caches. With that assumption, the number of misses can be estimated independently for the L1 instruction cache 350 and the L1 data cache 330 using separate reuse histograms for instructions and data with appropriate block sizes. In order to estimate the number of misses for the unified L2 cache a joint histogram with instructions and data with the block size of the L2 cache needs to be merged from the separate instruction and data histograms. If the technique with time windows is used for the histograms, such a merge is needed for each time window.

Estimating Spatial Locality

Once a Memory Object has been brought into a cache, execution speed may be enhanced if all data items residing in the Memory Object are actually referenced by the Studied Application before the Memory Object is evicted from the cache. The larger fraction of the Memory Objects that are used by a Studied Application, the better is its so-called spatial locality.

We define Spatial Usage to be the average fraction of the Memory Objects that are used before their eviction from cache. Spatial Usage can be estimated for the entire execution of the Studied Application, or for a subset thereof, including but not limited to the Memory References of one of its loops, its Memory References to a selection of its data structures, or its Memory References performed by one of its fuctions.

One way of measuring the Spatial Usage is to first estimate the number of misses MO for a studied cache size Z and a Memory Object size 0 corresponding to the cache line size of the studied cache. Secondly the number of misses MA assuming the same size cache Z but a Memory Objects size corresponding to various data sizes A accessed by each Memory Reference is estimated. Assuming a perfect Spatial Usage, the fraction between the two miss estimates (MA/MO) should be equal to the fraction between the Memory Object size O and the average Memory Object size A.

In the case of a non-perfect Spatial Usage, the Spatial Usage ratio, where 1.0 indicates a perfect usage, can be estimated as a function of the modeled caches size S:

Spatial_usage(S)=MA*avg(A)/MO*O. A more generalized formula for Spatial Usage is:

$$\text{Spatial\_usage}(Z) = \frac{\sum_{i=1}^{M}(Asize(i) * Pm_A(i))}{Osize * \sum(Pm_O(i))}$$

$$\approx \frac{\sum_{i=1}^{M}(Asize(i) * Pm_A(i))}{M * Osize * Pmisstot_O}$$

, where M is the number of studied Samples from the ACD, Asize(i) is the accessed size for each such Sample and Osize is the Memory Object size for the modeled cache. Pm(i) is the miss probability for each Sample assuming the Object size indicated by the subscript letter and Pmisstot is the average miss probability for all the studied Samples assuming a Memory Object size of O.

$Pmisstot_O$ can be estimated for cache size Z using any of a number of suitable or appropriate methods, including but not limited to the methods described with reference to FIG. 14 (for random replacement) or FIG. 17 (for LRU replacement).

$Pm_A(i)$ can be estimated individually for each Sample, for example by using the Pmiss Method 440 described in FIG. 4 (for random replacement) and cache size Z and using the $Pmisstot_O$ estimated above for random replacement for the likelihood of a cache replacement: $Pm_A(i)=Pmiss(Pmisstot*rd_A(i))$, where $rd_A(i)$ is the reuse distance for each Sample i for Memory Object size A recorded in the ACD.

Another examples of how to estimate $Pm_A(i)$ includes, but is not limited to, the Method described with reference to FIG. 15 to first build a translation table S(D) based upon ACD data for Memory Object size O, and then use this S(D) individually to estimate either miss ($Pm_A(i)=1$) or hit ($Pm_A(i)=0$) based upon each value of the reuse distance $rd_A(i)$, where $rd_A(i)$ is the reuse distance for each Sample i for Memory Object size A recorded in the ACD.

While the technique described above works well for estimating the Spatial Usage for cache sizes with a high miss rate, the low miss rates of larger caches require the cold misses to also be taken into account in order to get an accurate estimate:

$$\text{Spatial\_usage}(S) = \frac{\sum_{c=1}^{no\_cold_A}(Asize(c)) + \sum_{i=1}^{M_A}(Asize(i) * Pm_A(i))}{Osize * (no\_nold_O + M_O * Pmisstot_O)}$$

The estimation of the number of cold misses (no_cold) can be estimated using the technique described with reference to FIG. 13 for each of the Memory Object size indicated by the subscript.

The number of unnecessary misses caused by poor Spatial usage for any given Memory Object size can be estimated by first calculating one minus the special usage, and then multiplying by the result with the estimated miss rate, which may be estimated using the Methods described in FIG. 14 or FIG. 17.

Spatial_miss_rate(S)=(1−Spatial_usage(S))*Miss_rate(S).

Figure 21:
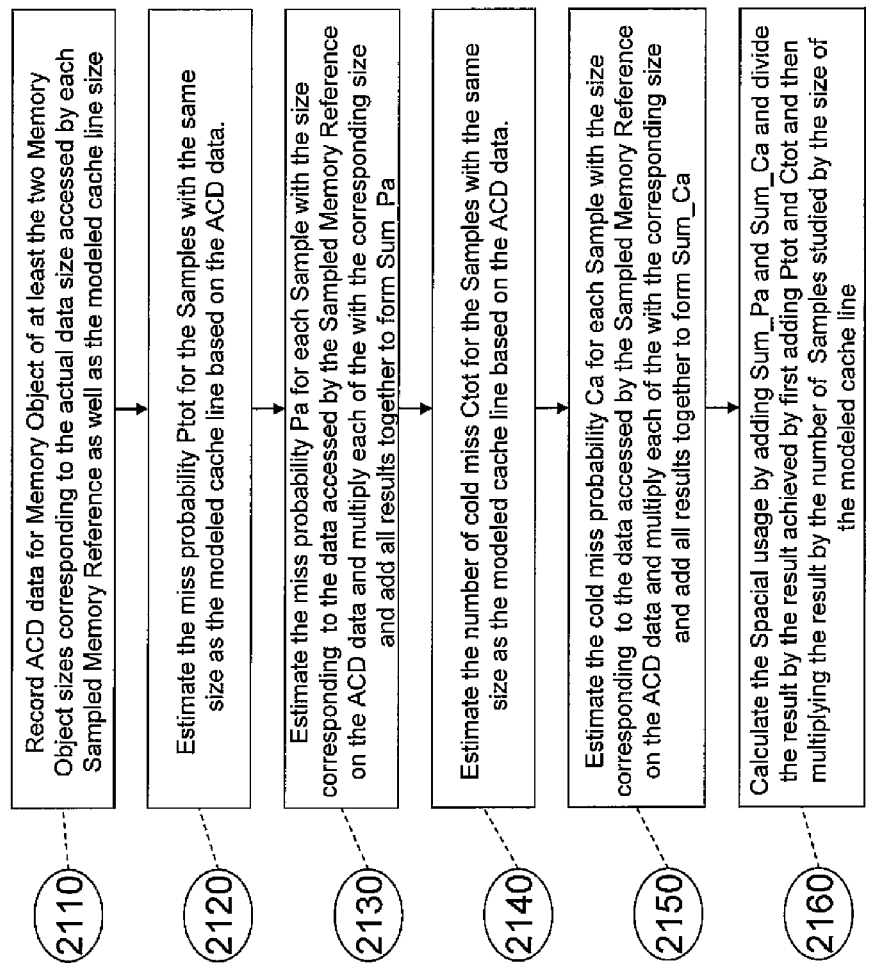
FIG. 21 is a flow chart of a method estimating spatial usage.

Turning now to FIG. 21: At step 2110 sampling of ACD data is performed for at least two Memory Object sizes, of which one is the size CL which may correspond to the cache line size of the cache to be modeled, and at least one of the other sampled sizes SL is smaller than CL. In one embodiment this could be done similarly to the method depicted at step 1101 in FIG. 11. One implementation is to choose size SL equal to the size of the data accessed by the sampled Memory Reference. Another example is to use a constant size for SL.

At step 2120 the miss probability Ptot is estimated for samples of size CL from ACD with respect to a chosen cache size. In one embodiment this could be done similarly to the method depicted in FIG. 14.

At step 2130 the miss probability Pa is estimated for each samples of size SL in ACD with respect to the chosen cache size. In one embodiment this could be done similarly to the method depicted in FIG. 14. Each Pa value is multiplied by the corresponding size SL and the results are summed to form Sum_Pa.

At step 2140 the coldmiss probability Ctot is estimated for samples of size CL from ACD with respect to the chosen cache size. In one embodiment this could be done similarly to the method depicted in FIG. 13.

At step 2150 the coldmiss probability Ca is estimated for each samples of size SL in ACD with respect to the chosen cache size. In one embodiment this could be done similarly to the method depicted in FIG. 13. Each Ca value is multiplied by the corresponding size SL and the results are summed to form Sum_Ca.

At step 2160 the Spatial_usage is estimated by, for example, calculating the value of (Ca+Pa)/(CL*M*(Ptot+Ctot)), where M is the number of samples from ACD used to estimate the values Ca, Pa, Ctot and Ptot.

Handling Samples from Different Contexts

The CPU executing the Studied Application may perform a context switch and start executing a different context, such as a different process and/or a different thread, fiber, strand, task or co-routine. In order to handle this case correctly, a virtualization of the hardware counters may seem necessary, i.e., the value of the hardware counters should be saved and restored by the operating system, or in some other way, such that it appears that each context has its own set of hardware counter, trap mechanisms and/or Watch Points.

If the system running is lacking virtualization of the hardware counters, this may be compensated for be the samples mechanism and/or the system model methods. One way of doing this is to tag a context ID (CID) to each of sample and to determine if some other context has been sampled between the sample was initiated and the reuse distance was recorded, i.e., during the Reuse Area as shown in FIG. 7. If so, the fraction of samples started by this context may be determined by dividing the number of samples started by this context with the total number of samples started during the Reuse Area. The reuse distance recorded may then be adjusted by multiplying its value with this fraction.

Modeling Parallel Activities

If several parallel activities, such as Threads or processes, are executing simultaneously on a Host Computer System, their ACD information may be recorded in a way that later allows a global view of the recorded activity of the execution. In this disclosure the term Thread is used to represent any such form of parallel activity.

The ACDs of several parallel activities may be put into the same data structure residing in memory, disk or elsewhere, or written into private ACD data structures. Each Sample can be tagged in a way that allows a representative approximation of the interleaving between the activities recorded for each Sample. This can be done, for example, using some kind of timestamptimestamp tagged to each Sample or by setting global Watch Points when recording reuse distances. Many possible schemes for tagging the Samples exist. In one scheme, a global clock is used to timestamp each recorded activity. Other solutions include, but are not limited to, using distributed clocks that are running in some synchronous or semi-synchronous way.

When modeling cache shared by several parallel activities, the reuse distance between two accesses to a Memory Object can be measured as the estimated sum of all intervening Memory References performed by all the Threads sharing that cache. The ACD data may be recorded with respect to one specific cache-sharing topology or may be recorded in a way that allows many different cache-sharing topologies to be modeled. In one embodiment, this may be done by determining or recording the number of Memory References performed so far for several of the Threads at the point in time a Sample is initiated as well as when the Sample is triggered (e.g., when one of its Watch Points is triggered). Another implementation is to timestamp the point in time when the sample is taken and triggered. This may be combined with an estimation of how many Memory References each Thread is performing per time unit. Another implementation includes, but is not limited to, recording of some Thread-local information, such as a local time stamp or the local number of Memory references performed at the Sampling point and triggering point, and to combine this with estimation of how many Memory References each Thread is performing for each of these units.

Modeling Coherence Misses

When modeling parallel activities accessing different caches, the cache coherence protocol, keeping the coherence between the caches, should also be taken into account. A coherence miss is defined as a Memory Reference which would have resulted in a cache hit in a non-coherent system, but has been turned into a cache miss caused by an intervening Memory Reference performed by another Thread not sharing the same cache. One examples of coherence misses can be found, for example, in a write-invalidate coherence protocol where a write performed by a Thread belonging to a different cache causes an invalidation activity and invalidates a Memory Object of the other cache. If such an intervening invalidation activity occurs between two Memory References performed by a Thread attached to one of the invalidated caches, a cache miss will occur regardless of the reuse distance between these two Memory Reference. Another coherence miss example is a downgrade miss, where a read Memory Reference performed by a Thread belonging to a different cache would cause downgrade activity and cause a Memory Object of a modeled cache to lose its write permission. A following local write Memory Reference to that cache will result in a cache miss regardless of the reuse distance to any previous local write Memory Accesses.

In order to model the coherent interaction as well as cache sharing between the Threads executing on any modeled memory configuration, each Watch Point mechanism used for the sampling of a Threaded execution may be set up in a global fashion. A Thread J may set a Watch Point for a Memory Object, which is later referenced by another Thread K between the point in time where the sampling was initiated by Thread J and the point in time where the Watch Point was triggered by Thread J. In that example, the intervening access to the memory Object by Thread K should cause the Watch Point to trigger in a way such that necessary information is recorded. In one embodiment, such an intervening Memory Reference by a different Thread K is recorded in the ACD associated with Thread J's first Memory Reference to A. One implementation is to keep the Watch Point active after the recording of the interleaving activity, anticipating the next Memory Reference to the Memory Object. Once the second access to Memory Object A by Thread J has been detected, the reuse distance to the first access to the Memory Object will be recorded in the ACD.

This way, the Sparse ACD 240 of FIG. 2 should be extended to also record information about intervening Memory References performed by other Threads. In one embodiment, information about every intervening Memory Reference is recorded. Examples of such information include, but are not limited to, the Thread ID of the intervening Thread, instruction address of the intervening instruction, as well as its access type, such as read, write or prefetech and the size of the Memory Object accessed.

In one embodiment, only information about a limited number of intervening Memory References is recorded in the ACD.

Figure 22:
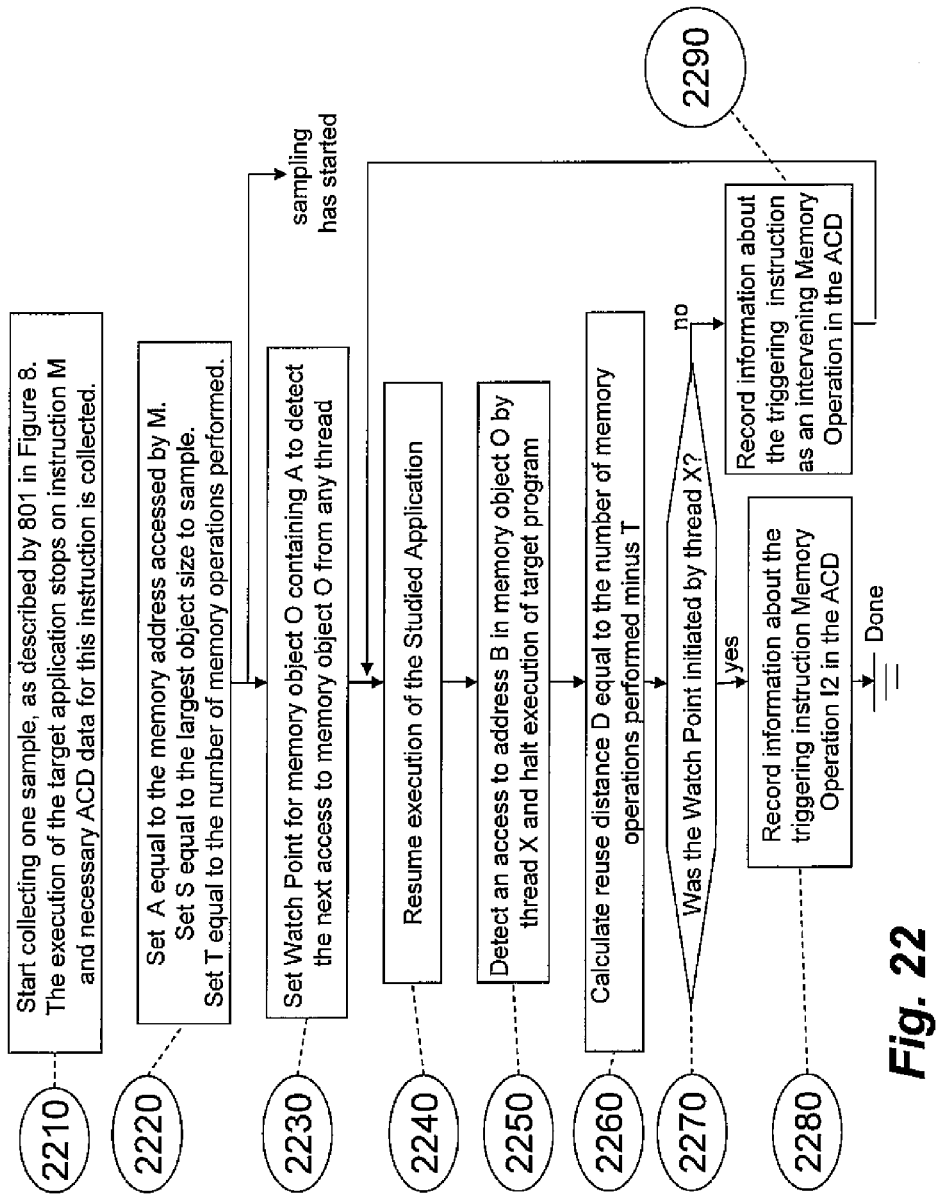
FIG. 22 is a flow chart of a method for collecting samples from multithreaded execution.

Turning now to FIG. 22: At step 2210 the Sampling of one Sample is initiated. This could for example be done as depicted in step 801 of FIG. 8.

At step 2220 information about the first Memory Reference of the Sample is recorded. Such recorded information could for example be the address of the Memory Reference instruction, the address accessed by that instruction, the Memory Reference type the thread ID, and some timestamp or ordering information associated with the event.

At step 2230 some kind of Watch Point mechanism is initiated for a Memory Object containing the data accessed by the Memory Reference such that the next reference to the Memory Object by any of the monitored threads will trigger step 2250.

At step 2240 the execution of the studied application is resumed.

At step 2250 the Watch Point set up at step 2230 is triggered.

At step 2260, some information about the Memory Reference triggering the Watch Point at step 2250 is recoded. Examples information that may be recorded include the address of the Memory Reference instruction, the address accessed by that instruction, the Memory Reference type and some timestamp or ordering information associated with the event.

At step 2270 it is determined if the Memory Reference triggering the Watch Point at step 2250 was performed by the same thread that initially initiated this Sample. If so, we turn to step 2280, otherwise we turn to step 2290.

At step 2280 information about the Memory Reference triggering the Watch Point mechanism at step 2250 is recoded and associated with the second access to the Memory Object in this sample. Examples information that may be recorded include the address of the Memory Reference instruction, the address accessed by that instruction, the Memory Reference type and some timestamp or ordering information associated with the event.

At step 2280 information about the Memory Reference triggering the Watch Point mechanism at step 2250 is recoded and associated with list of intervening Memory References. Examples information that may be recorded include the address of the Memory Reference instruction, the address accessed by that instruction, the Memory Reference type, the thread ID, and some timestamp or ordering information associated with the event Modeling Multithreaded Memory Systems One way to model coherence misses is to use a two-phase procedure. The first phase is to estimate the overall miss ratio and the probability for a hit or a miss for a Memory Reference in a non-coherent system while only taking accesses from Threads sharing the same cache into account. This could for example be performed using the method described with reference to FIG. 14 or 17, depending on the cache organization model: random or LRU. The second phase determines if intervening Memory references by Threads attached to other caches will turn a previously determined cache hits into a cache miss. If a certain memory operation was deemed to be a cache hit with the probability X during the first phase, but it is later determined that an intervening Memory Reference by a different Thread turned it into a cache miss, a coherence miss has been determined with the probability X.

Figure 23:
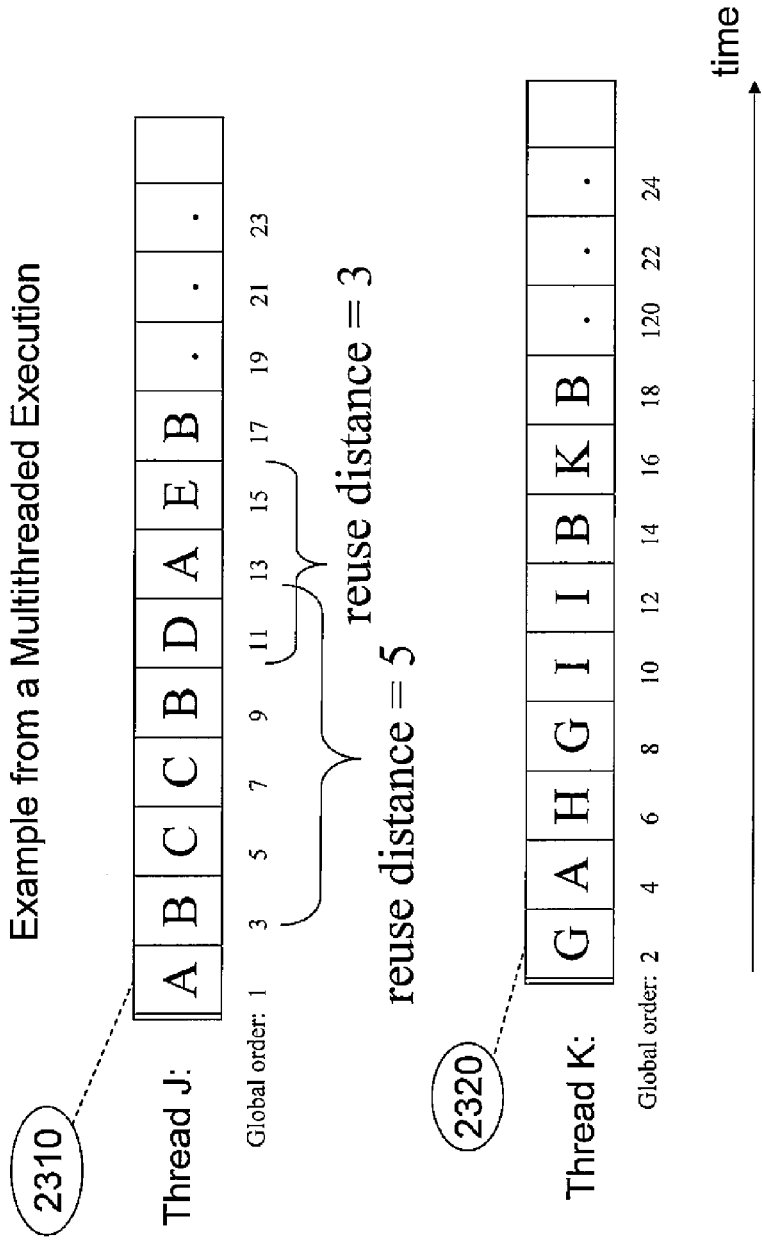
FIG. 23 is a diagram illustrating two streams of memory references stemming from the simultaneous execution of two Threads.
Figure 24:
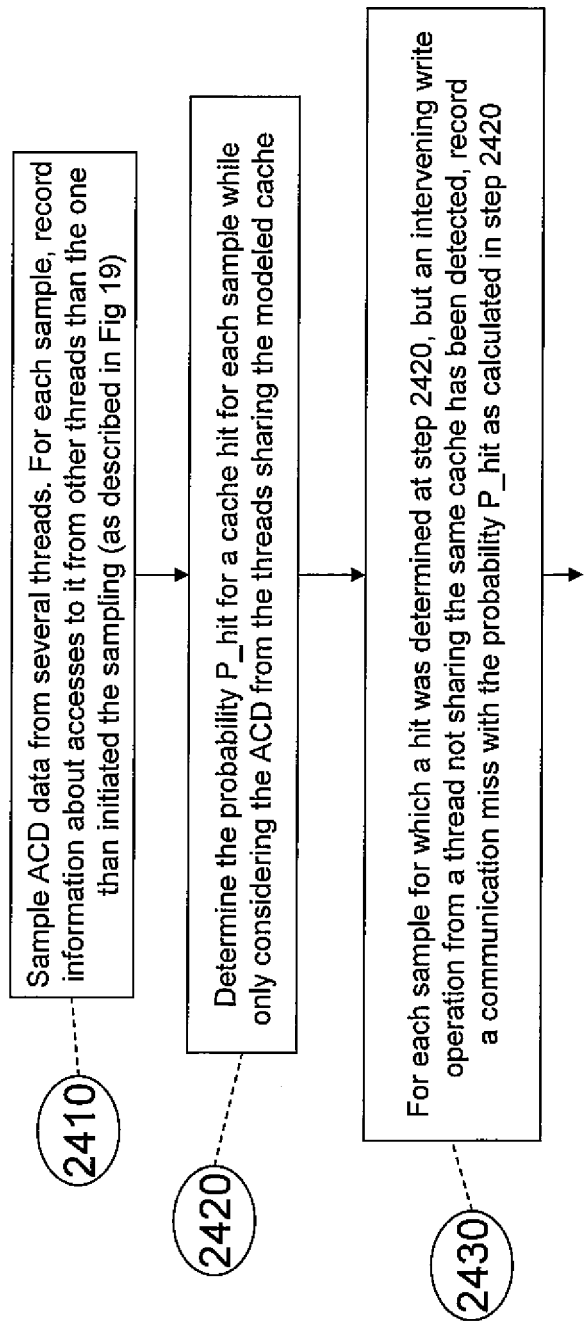
FIG. 24 is a flow chart describing multithreaded modeling.

FIG. 23 illustrates an example with memory streams stemming from two simultaneously executing Threads J (2010) and K (2020). Each memory access has here been labeled with its global sequence number in this example. The memory access stream of Thread J (2010) contains two accesses to the Memory Object A.

Assuming that Threads J and K do not share the modeled cache, the reuse distance for Memory Object A is 5 (#3, #5, #7, #9; and #11) during the first phase and the corresponding miss probability Pmiss for the J's second access to A can be estimated, for example by using the Method 510 in FIG. 5. During the second phase it is determined that one intervening access by Thread K is recorded (#4 in 2320) between Thread J's two Memory References to Memory Object A in the memory stream 2310. This result in a communication miss probability Pmiss to be estimated depending on the memory operation (read or write) performed by Memory Reference #1, #4 and #13. Examples of combination where a coherence miss may be recorded include combinations where: #4 is a write and #13 is a read (invalidation); and, #1 and #13 are writes and #4 is either a read (downgrade) or a write (invalidation).

A communication for a specific memory operation can be detected by setting a Watch Point mechanism for the memory object accessed by one thread. If the Watch Point mechanism later is triggered by a memory operation performed by a thread other than the thread first accessing the memory object, and either of the two threads perform a write operation to the memory object, a communication miss has been detected.

If the Watch Point is kept alive to monitor more accesses to the memory object from the two threads the identity of the data-sized object within the memory object accessed by each thread is recorded and it is determined that the two threads do not access the same data-sized objects, the communication miss detected is of the type false sharing.

If the two Threads of FIG. 23 share the same cache in the modeled Memory System, the applicable reuse distance for the a Sample started for Memory Reference #1 could either be measured to #4 (reuse distance 3) or to #13 (reuse distance 11), depending on the type of memory references for #1, #4 and #13. For example, if #1 is a write and #4 is either a read or a write then reuse distance 3 should be used; if #1 is a read and #4 is a read then reuse distance 3 should be used; or if #1 is a read and #4 is a write then reuse distance 11 should be used.

Detecting False Sharing

The coherence misses described above would occur as long as the data accesses by the two Threads reside in the same Memory Object (sometimes referred to as a cache line) even if the Threads do not access the very same piece of data within that Memory Object. This is known as false sharing in the literature, i.e., the two memory operations do not directly share any piece of data values and the coherence miss detected is purely a caused by the Memory Object size in combination with the data layout in memory.

A different data layout in memory, such that the two data values do not reside in the same Memory Object, would remove the coherence miss. The false sharing coherence misses can potentially be removed if a different data layout or a different cache line size was applied. Thus, it is important to distinguish the false sharing coherence misses from the true sharing coherence misses.

One way to detect false sharing is to set up two Watch Points for each sampled memory access, one for the size corresponding to the cache line of the modeled cache and one for the size corresponding to the size of the data object being accessed by that very memory operation. For example, in the case of a "load byte" memory operation, one Watch Point mechanism of the size one byte and one Watch Point corresponding to the Memory Object size (cache line size) would be created. If the Memory Object-sized Watch Point detects coherence while the byte-sized Watch Point does not, false sharing has been detected. If the byte-sized Watch Point also detects coherence, true sharing has been detected. In one embodiment the smaller Watch Point size is chosen to some size smaller than the cache line size, but not necessarily equal the accessed data size. Still, many false sharing cases may still be detected.

Spatial Communication Locality

Similar to Spatial Locality, Spatial Communication Locality is a measurement of the fraction of a cacheline that has been involved in a coherence miss, and that is used before it is either evicted, downgraded, invalidated or affected in some way that will later result in a cache miss or coherence miss. Similar to the detection of Spatial Locality the amount of Spatial Communication Locality can be measured by comparing the amount of coherence activities that take place for differently sized Memory Objects. For example, the amount of miss activity (MA) associated with a Memory Object size A corresponding to the actual access size of the Memory Reference can be compared with the miss activity (MO) associated with a Memory Object size O corresponding to the cache line size or the coherence unit size or the data size for which the coherence is maintained if this differs from the cache line size. Similarly to Spatial_usage, we can define Spacial_communication_usage to be the fraction of the cache line used. The following formula symbolizes one of many possible ways of estimating its value.

Spatial_communication_usage($S$)=$MA*avg(A)/MO*O$

Estimating Cache Sharing Effects

The cache behavior of an application can be represented by a function or curve showing how the cache miss rate changes as a function of cache size. If memory accesses caused by other means than cache misses are taken into account, including but not limited to hardware and software prefetching, a function or curve showing how the number of fetches from the next higher cache level changes as a function of cache size. For the cache level closest to the memory system, such a function or curve would correspond to the number of accesses to the memory.

In one embodiment, such miss functions or fetch functions can be produced based on ACD data. This could for example be performed using the method described with reference to FIG. 14 or 17, depending on the cache organization model: random or LRU, while varying the cache size modeled by the selected scheme. Similarly, the corresponding fetch functions can be estimated if memory accesses caused by other means than cache misses also is taken into account.

One can also model a function or a curve showing how the number of misses per time unit or fetches per time unit changes as a function of cache size, referred to as misses-per_tu and fetches_per_tu respectively. This could for example be done by scaling the earlier discussed miss function or fetch function.

In one embodiment, this is done by taking the latency effects of cache misses into account while taking the earlier discussed. Since smaller cache size causing a larger cache miss rate will cause the application to run slower compared with larger cache size resulting in a lower cache miss rate per time unit compare compared with if this fact was not being given any attention. The performance penalty for this may be estimated, for example by multiplying the increased number of misses with the miss penalty for each miss, and to compensate for this effect.

If the fetches_per_tu is known for several applications or threads sharing a cache, the fraction of the cache devoted to each application or thread can be estimated. Assuming a fully associative random replacement cache, all memory objects in the cache are equally likely to be evicted upon a replacement. From this follows that the fraction of an application's or thread's memory objects residing in a cache will be proportional to the fraction of memory objects it fetches to the cache with respect to the number of memory objects fetched to the cache by all applications or threads.

If we know the fetches_per_tu function for each of the applications or threads sharing a cache, we can find the fraction of the cache used by each application or thread by finding the collective working point for all threads such that the fraction between the amount of cache it uses and the fetches per time unit it produces at that point is equal for all the applicatrions or threads. Furthermore, the sum of the amount of cache used by each application should be equal to the total cache size of the shared cache.

Figure 25:
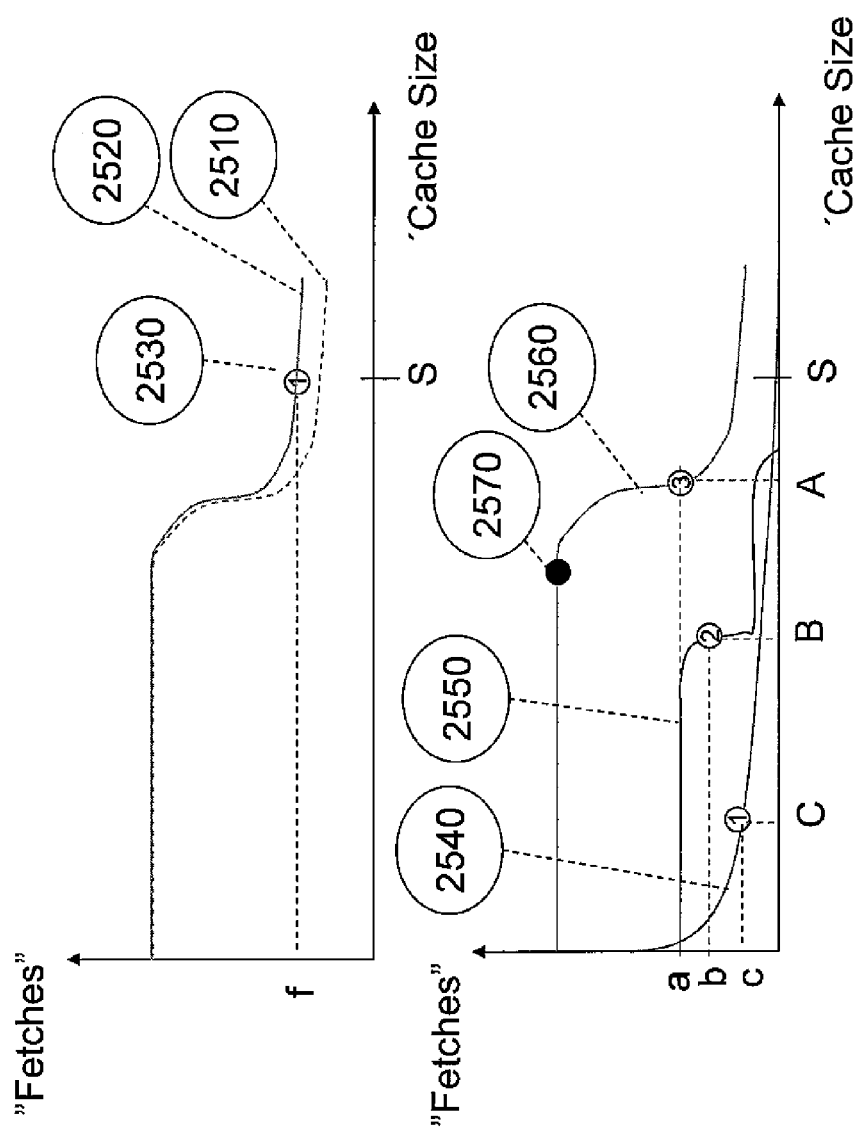
FIG. 25 is a drawing describing cache sharing modeling.

Turning now to FIG. 25, the top graph shows an example of a cache misses as a function of caches size for an application (2510), i.e., the fraction of memory accesses producing accesses to the next level (or memory for the top level), while curve 2520 displays the number of fetches per time unit. When the miss ratio goes down for larger caches the application runs faster and subsequently more fetches will occur per time unit if this is factored in. (For clarity, function 2520 and 2510 have been scaled to show the same value for a cache size=0). For a cache of size S, the working point for this application is shown by the number 1 labeled 2530. The number of fetches performed at the working point can be read out at the y-axis and is labeled f.

The lower graph of FIG. 25 showing the fetches per time unit as a function of caches size for three applications (2540, 2550 and 2560) sharing a cache of size S. The working points for each application, labeled 1, 2, and 3, has the property that the fraction of misses per second for each application (lower case letters a, b and c) divided by their respective cache size used (capital letters A, B, and C) is identical for all three applications, furthermore A+B+C=S. Given that the misses per second functions 2540, 2550 and 2560 are known, the three respective working points can be found by iterative methods.

In one embodiment of such an iterative method, each application is given an equal share of the cache to get an initial guess and the fraction between fetches and estimated share of the cache is calculated. Applications with too high ration are assigned a slightly larger cache size and application with a too low ratio is assigned a smaller portion of the cache in such a way that the sum of cache size assigned to each application is still equal to the total cache size, where after a new fraction is calculated for each application. This step is repeated until the fractions for all applications are within a certain threshold.

Modeling Other Forms of Caches

Caching techniques are widely used as hardware and software techniques to speed up various forms of execution, including but not limited to, web caching, disk caching, caching of address translations in a TLB and caching of branch history in a branch predictor. The virtual memory mechanism that moves data between different levels in the storage hierarch, for example a hierarchy consisting of fast RAM—slow RAM—disk—tape, is a form of caching of data. Even though the corresponding Memory Object size, the cache size and some other properties may vary widely compared with the memory systems described so far in this disclosure, the techniques and mechanisms described herein is also applicable for all kinds of caching. The conclusions drawn from the modeling of such system using the methods described herein can be used to improve the efficiency of the caching strategy, including but not limited to giving feedback and suggestion of improvements to the system developer or using the information to dynamically change the caching strategy at runtime.

The methods and techniques described in this disclosure may be applied at all ACD data collected during the entire execution of the Studied Application. Each method can also be applied to just a selection of ACD data, such as the ACD data associated with one data structure; with a set of data structures; with one specific instruction; with one set of instructions such as the instructions of one loop or the instructions of one function; with one phase of the execution; with one time window of execution; or any other possible selection of ACD data. Multiple cascaded selections may also be applied, such as a selection of ACD data performed by the instructions of one specific loop accessing one specific data structure.

Such selection can be performed, for example, through a three-phase strategy, where all ACD data is used in the first phase to estimate some overall performance properties, such as the miss rate (for the modeling of random replacement caches) or the translation table from reuse distance to stack distance (for modeling LRU caches).

The second phase is to pick out the selected Samples according to the selection criteria. For a data structure starting at address A and ending at address B, only Samples concerning data addresses in that address range are considered. Such can also be performed, for example, on a instruction address basis or time-stamp basis.

The third phase is to go through the selected Samples and estimate one of the estimations outlined by some estimation Methods outlined in this application.

One such example of how to apply the three phases is how to estimate the hit rate for all the Memory References performed by one specific instruction at address I in a random replacement cache of size S. First, the entire application is run and a sparse ACD is collected. As a first selection phase, the miss rate R of the application is estimated using all the samples as outlined in FIG. 14 with respect to a cache of size S. As described earlier in this application, this may be done by dividing the Samples of the ACD into Sample windows and applying the Method of FIG. 14 to each window and thus the R value for that specific window. As a second selection step, the Samples for which 12 (referring to ACD 240 of FIG. 2) is equal to I are selected. As a third step, the miss probability for each of these Samples is estimated using the Method 440 of FIG. 4, in which the number of cache misses since last touched is calculated as the miss probability for the corresponding sample window (estimated during phase two) multiplied by the reuse distance for that Sample with respect to a cache of size S. The average miss rate for Instruction I is calculated as the average of the miss probability values estimated in phase three.

Alternative Implementations

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. It should be noted and understood that certain publications, patents and patent applications mentioned in this specification are indicative of the level of skill in the art to which the invention pertains. All publications, patents, and patent applications are herein incorporated by reference to the same extent as if each individual publication, patent or patent application was specifically and individually indicated to be incorporated by reference in its entirety.

What is claimed is:

1. A method, comprising:
executing a sequence of operations for a plurality of threads of a multithreaded program of instructions in response to said program of instructions;
selecting a set of operations from said sequences of operations;
monitoring respective operations of said set of operations in response to a first thread from the plurality of threads;
recording access information associated with respective operations of said set of operations and identifying one or more memory objects being accessed by respective ones of said set of operations;
enabling a trap mechanism operable to detect one or more next operations accessing one or more of said memory objects in response to a second thread, different from the first thread, from the plurality of threads, access information associated with the second thread being stored in performance characteristic data, the trap mechanism remaining active until an operation from the first thread triggers a watch point mechanism; and
recording access information about said next operations.

2. The method according to claim 1, wherein only a limited number of trap mechanisms from the plurality of threads different than from the first thread being recorded.

3. The method according to claim 1, wherein a write operation from the one or more next operations is an indicator for a communication miss.

4. A method, comprising:
executing a sequence of operations for a plurality of threads of a multithreaded program of instructions in response to a program of instructions;
selecting a set of operations from said sequences of operations;
monitoring respective operations of said set of operations in response to a first thread from the plurality of threads;
recording, when at least one of the respective operations is a write operation, access information associated with respective operations of said set of operations and identifying one or more memory objects being accessed by respective ones of said set of operations;
enabling a trap mechanism operable to detect one or more next operations accessing one or more of said memory objects in response to a second thread, different from the first thread, from the plurality of threads, access information associated with the second thread being stored in performance characteristic data, the trap mechanism remaining active until an operation from the first thread triggers a watch point mechanism;
recording access information about said next operations; and
indicating a communication miss when at least one of the one or more next operations is a write operation.

5. A method, comprising:
executing a sequence of operations for a plurality of threads of a multithreaded program of instructions in response to a program of instructions;
selecting a set of operations from said sequences of operations;
monitoring respective operations of said set of operations in response to a first thread from the plurality of threads;
recording, when at least one of the respective operations is a write operation, access information associated with respective operations of said set of operations and identifying one or more memory objects being accessed by respective ones of said set of operations;
enabling a trap mechanism operable to detect one or more next operations accessing one or more of said memory objects in response to a second thread, different from the first thread, from the plurality of threads, access information associated with the second thread being stored in performance characteristic data;

recording access information about said next operations and an identity within said memory objects being accesses by each thread; and indicating a false sharing miss when the first thread does not access a same data as the second thread, trap mechanism remaining active until an operation from the first thread triggers a watch point mechanism, only a limited number of trap mechanisms from plurality of threads different than from the first thread being recorded.

6. A method, comprising of:

executing a sequence of operations for a plurality of threads of a multithreaded program of instructions in response to a program of instructions;

selecting a set of operations from said sequences of operations;

monitoring respective operations of said set of operations in response to a first thread from the plurality of threads;

recording, when at least one of the respective operations is a write operation, access information associated with respective operations of said set of operations and identifying one or more memory objects being accessed by respective ones of said set of operations;

enabling a trap mechanism operable to detect one or more next operations accessing one or more of said memory objects in response to a second thread, different from the first thread, from the plurality of threads, access information associated with the second thread being stored in performance characteristic data;

recording access information about said next operations; and indicating a communication miss when at least one of the one or more next operations is a write operation, the trap mechanism remaining active until an operation from the first thread triggers a watch point mechanism, only a limited number of trap mechanisms from the plurality of threads different than from the first thread being recorded.

7. A method, comprising:

gathering memory usage information from an execution of a program of instructions for at least two memory object sizes;

estimating an amount of communication misses for each of said memory object sizes; and estimating a false sharing responsive to a number of communication misses detected for a specific instruction for a memory object satisfying a predetermined memory object size criteria, the estimating excluding each memory object having a memory object size smaller than said predetermined memory object size criteria.

8. A method, comprising;

gathering memory usage information from an execution of a program of instructions for at least two memory object sizes;

estimating an amount of communication misses for each of said memory object sizes to define an estimated amount of communication misses; and estimating a communication efficiency based on a ratio between the estimated amount of communication misses for said two memory object sizes, the estimating excluding each memory object having a smaller object size memory than a predetermined memory object size criteria.

* * * * *